(12) United States Patent
Asaoka et al.

(10) Patent No.: US 9,250,475 B2
(45) Date of Patent: Feb. 2, 2016

(54) LIQUID CRYSTAL DISPLAY DEVICE

(75) Inventors: Yasushi Asaoka, Osaka (JP); Kiyoshi Minoura, Osaka (JP); Eiji Satoh, Osaka (JP); Sayuri Fujiwara, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 287 days.

(21) Appl. No.: 13/880,511

(22) PCT Filed: Oct. 17, 2011

(86) PCT No.: PCT/JP2011/073830
§ 371 (c)(1),
(2), (4) Date: May 14, 2013

(87) PCT Pub. No.: WO2012/053477
PCT Pub. Date: Apr. 26, 2012

(65) Prior Publication Data
US 2013/0229606 A1    Sep. 5, 2013

(30) Foreign Application Priority Data

Oct. 21, 2010  (JP) ................. 2010-236864

(51) Int. Cl.
*G02F 1/1337* (2006.01)
*G02F 1/1333* (2006.01)
(Continued)

(52) U.S. Cl.
CPC ............ *G02F 1/1337* (2013.01); *G02F 1/1334* (2013.01); *G02F 1/133377* (2013.01); *G02F 1/13725* (2013.01); *G02F 1/133553* (2013.01); *G02F 2001/133773* (2013.01)

(58) Field of Classification Search
CPC .. G02F 1/133377; G02F 1/334; G02F 1/1337
See application file for complete search history.

(56) References Cited

U.S. PATENT DOCUMENTS

| 5,194,973 | A | 3/1993 | Isogai et al. | |
| 2001/0013912 | A1* | 8/2001 | Yamazaki et al. | ............ 349/113 |

(Continued)

FOREIGN PATENT DOCUMENTS

| JP | 04-199024 | 7/1992 |
| JP | 6-301005 | 10/1994 |

(Continued)

OTHER PUBLICATIONS

International Preliminary Report on Patentability and Written Opinion issued in International Application No. PCT/JP2011/073830 dated Nov. 8, 2011.

(Continued)

*Primary Examiner* — Richard Kim
*Assistant Examiner* — Kendrick Hsu
(74) *Attorney, Agent, or Firm* — Nixon & Vanderhye P.C.

(57) ABSTRACT

A liquid crystal display device (100A) of the present invention includes a liquid crystal layer (1) and first and second alignment films (12, 13) which are provided with an alignment treatment. The liquid crystal layer (1) includes, in each of the pixels, a plurality of first small sections (14a) separated by a wall (10) and the first alignment film (12) and a plurality of second small sections (14b) separated by the wall (10) and the second alignment film (13). Each of the plurality of first small sections (14a) has a first liquid crystal region (11a). Each of the plurality of second small sections (14b) has a second liquid crystal region (11b). Each of the first and second liquid crystal regions (11a, 11b) includes a nematic liquid crystal material and a dichromatic dye (21a, 21b). The dichromatic dye (21a) of the first liquid crystal region (11a) is aligned along the alignment direction of the first alignment film (12). The dichromatic dye (21b) of the second liquid crystal region (11b) is aligned along the alignment direction of the second alignment film (13).

20 Claims, 10 Drawing Sheets

(51) Int. Cl.
*G02F 1/1334* (2006.01)
*G02F 1/137* (2006.01)
*G02F 1/1335* (2006.01)

(56) References Cited

U.S. PATENT DOCUMENTS

| | | | |
|---|---|---|---|
| 2002/0140887 A1* | 10/2002 | Maeda et al. | 349/113 |
| 2010/0302488 A1* | 12/2010 | Asaoka et al. | 349/123 |
| 2011/0157529 A1 | 6/2011 | Asaoka et al. | |
| 2011/0205467 A1 | 8/2011 | Satoh | |
| 2011/0292325 A1 | 12/2011 | Minoura | |

FOREIGN PATENT DOCUMENTS

| | | |
|---|---|---|
| JP | 8-248398 | 9/1996 |
| JP | 2007-101843 | 4/2007 |
| WO | WO 2009069249 A1 * | 6/2009 |
| WO | WO 2010/023851 | 3/2010 |
| WO | WO 2010/134236 | 11/2010 |

OTHER PUBLICATIONS

International Search Report for PCT/JP2011/073830, dated Nov. 8, 2011.

* cited by examiner (a)

(b)

(c)

(a)

(b)

LIQUID CRYSTAL DISPLAY DEVICE

This application is the U.S. national phase of International Application No. PCT/JP2011/073830 filed 17 Oct. 2011 which designated the U.S. and claims priority to JP Patent Application No. 2010-236864 filed 21 Oct. 2010, the entire contents of each of which are hereby incorporated by reference.

TECHNICAL FIELD

The present invention relates to a liquid crystal display device and particularly to a polymer dispersed liquid crystal display device.

BACKGROUND ART

Liquid crystal display devices have been widely used in various devices, such as liquid crystal television displays, monitors, mobile phones, etc., as flat panel displays which have various advantages, such as slim body, light weight, etc. However, one type of the liquid crystal display devices which presently has the widest applications employs two or one polarizing plate so that, disadvantageously, the light utilization efficiency is low.

Conventionally, as the display type which does not employ a polarizing plate, the guest-host type and the Polymer Dispersed Liquid Crystal (PDLC) type have been proposed (for example, Patent Documents 1 and 2).

Patent Document 2 discloses a PDLC-type liquid crystal display device which has improved scattering efficiency. A liquid crystal layer of the PDLC-type liquid crystal display device (PDLC layer) includes a plurality of liquid crystal regions (or "liquid crystal droplets") dispersed in a polymer material. The liquid crystal regions are formed in spaces defined by polymer walls (hereinafter, referred to as "small sections"). In the PDLC having such a structure, when no voltage is applied (i.e., in the absence of an applied voltage), there is a difference in refractive index between the liquid crystal in the liquid crystal regions and the polymer, so that light is scattered by the interfaces between the liquid crystal regions and the polymer, resulting in a white display state. When a voltage is applied across the PDLC layer (i.e., in the presence of an applied voltage), the alignment of the liquid crystal changes so that the liquid crystal and the polymer have generally equal refractive indexes, allowing light to be transmitted through the PDLC layer without being scattered. If, in this situation, there is a light-absorbing plate on the rear side of the liquid crystal layer, the transmitted light is absorbed by the light-absorbing plate, resulting in a black display state. The entire disclosures of Patent Document 2 are incorporated by reference in this specification.

Patent Document 1 discloses a PDLC-type liquid crystal display device which includes a dichromatic dye. Specifically, this liquid crystal display device includes an upper polymer-LC composite film and a lower polymer-LC composite film in which a nematic liquid crystal material and a dichromatic dye are dispersed in gaps of the polymer. In each of the polymer-LC composite films, the nematic liquid crystal material is aligned in a predetermined direction in a plane which is generally parallel to the electrode plane. The alignment azimuth of the nematic liquid crystal material in the upper polymer-LC composite film and the alignment azimuth of the nematic liquid crystal in the upper polymer-LC composite film are set so as to form an angle of 90° with respect to each other. It is disclosed that the liquid crystal display device having such a configuration is capable of achieving a required contrast ratio and a reduced driving voltage even when the cell gap of the liquid crystal display device is narrowed.

CITATION LIST

Patent Literature

Patent Document 1: Japanese Laid-Open Patent Publication No. 8-248398
Patent Document 2: WO 2010/023851

SUMMARY OF INVENTION

Technical Problem

However, in the liquid crystal display device disclosed in Patent Document 1, alignment films and liquid crystal droplets are not in contact with each other. Therefore, the alignment of liquid crystal molecules that are present in the liquid crystal droplets cannot be perfectly controlled, and absorption of the dichromatic dye cannot be increased. Thus, the contrast ratio of the liquid crystal display device is low.

After formation of the polymer-LC composite films respectively on two substrates, the two substrates are combined together, and therefore, the manufacturing process is complicated. Further, due to impact or the like, there is a high probability that air bubbles are produced in the polymer-LC composite films.

The present invention was conceived in view of the above circumstances. One of the objects of the present invention is to provide a liquid crystal display device which is capable of achieving a high contrast ratio and which can be manufactured by a simple and convenient method.

Solution to Problem

A liquid crystal display device of the present invention is a liquid crystal display device having pixels, including: a liquid crystal layer whose state is switchable between a light-transmitting state in which light is transmitted through the liquid crystal layer and a light-scattering state in which light is scattered by the liquid crystal layer; a first substrate and a second substrate between which the liquid crystal layer is held; a pair of electrodes between which the liquid crystal layer is interposed and which are configured to apply a voltage across the liquid crystal layer; and first and second alignment films respectively provided between the liquid crystal layer and the first substrate and between the liquid crystal layer and the second substrate, the first and second alignment films being provided with an alignment treatment, wherein the liquid crystal layer includes, in the pixels, a continuous wall, a plurality of first small sections separated by the wall and the first alignment film, and a plurality of second small sections separated by the wall and the second alignment film, each of the plurality of first small sections has a first liquid crystal region, each of the plurality of second small sections has a second liquid crystal region, each of the first and second liquid crystal regions includes a nematic liquid crystal material and a dichromatic dye, the dichromatic dye of the first liquid crystal region is aligned along a first azimuth which is defined by the first alignment film, and the dichromatic dye of the second liquid crystal region is aligned along a second azimuth which is defined by the second alignment film.

In one embodiment, the first azimuth and the second azimuth are perpendicular to each other.

In one embodiment, the first and second liquid crystal regions do not contain a chiral agent.

In one embodiment, the liquid crystal layer includes the plurality of first and second small sections at a density of 0.064 sections/μm² or higher.

In one embodiment, the liquid crystal layer includes the plurality of first and second small sections at a density of 1 section/μm² or higher.

In one embodiment, a maximum width of each of the plurality of first and second small sections is not less than 0.6 μm and not more than 6 μm.

In one embodiment, a difference between an extraordinary refractive index ne and an ordinary refractive index no of the nematic liquid crystal material included in the first and second liquid crystal regions is not less than 0.1 and not more than 0.3.

In one embodiment, the above-described liquid crystal display device further includes a plurality of third and fourth small sections which are separated by the wall, wherein the plurality of third small sections are present in the vicinity of the first alignment film and each have a third liquid crystal region, the plurality of fourth small sections are present in the vicinity of the second alignment film and each have a fourth liquid crystal region, each of the third and fourth liquid crystal regions includes the nematic liquid crystal material and the dichromatic dye, the dichromatic dye of the third liquid crystal region is aligned along the first azimuth, and the dichromatic dye of the fourth liquid crystal region is aligned along the second azimuth.

In one embodiment, a surface free energy of the first and second alignment films is not less than 44 mJ/m² and not more than 50 mJ/m².

In one embodiment, a dielectric anisotropy of the nematic liquid crystal material is positive.

In one embodiment, each of the pair of electrodes which are configured to apply a voltage across the liquid crystal layer is a transparent electrode.

In one embodiment, any one of the pair of electrodes which are configured to apply a voltage across the liquid crystal layer is a reflective electrode.

In one embodiment, any one of the pair of electrodes which are configured to apply a voltage across the liquid crystal layer is a scatter reflection electrode.

In one embodiment, in the above-described liquid crystal display device, a surface of the scatter reflection electrode has unevenness, and a difference between a highest portion and a lowest portion of the surface of the scatter reflection electrode which is attributed to the unevenness is not less than 100 nm and not more than 500 nm.

In one embodiment, the above-described liquid crystal display device further includes an active element which is provided on the first substrate and which is provided in each of the pixels, the active element having a memory property, a wire which is provided on the first substrate, and an interlayer insulating film which is provided on the active element and the wire, wherein the scatter reflection electrode is provided on the interlayer insulating film, and when measuring an intensity of reflection by the scatter reflection electrode of light which is incident on the scatter reflection electrode from a direction of −30° with respect to a normal direction of the scatter reflection electrode where a clockwise direction is a positive direction and a counterclockwise direction is a negative direction, $0.02 < I(35°)/I(30°) < 0.1$ holds true (where) $I(\theta°)$ is an intensity of reflection which is measured in a direction of $\theta°$ with respect to the normal direction of the scatter reflection electrode).

In one embodiment, in the above-described liquid crystal display device, $I(40°)/I(30°) < 0.02$ also holds true.

In one embodiment, a region in which the active element and the wire are provided occupies ⅓ or more of an area of the pixel.

In one embodiment, a portion of the interlayer insulating film extending over a region in which none of the active element and the wire is provided has unevenness which is formed by patterning the portion.

In one embodiment, a thickness of the interlayer insulating film is not less than 1.5 μm and not more than 3.5 μm.

Advantageous Effects of Invention

According to the present invention, a liquid crystal display device is provided which is capable of achieving a high contrast ratio and which can be manufactured by a simple and convenient method.

DESCRIPTION OF EMBODIMENTS

Hereinafter, a liquid crystal display device 100A of the present invention is described with reference to FIG. 1 and FIG. 2.

Figure 1:
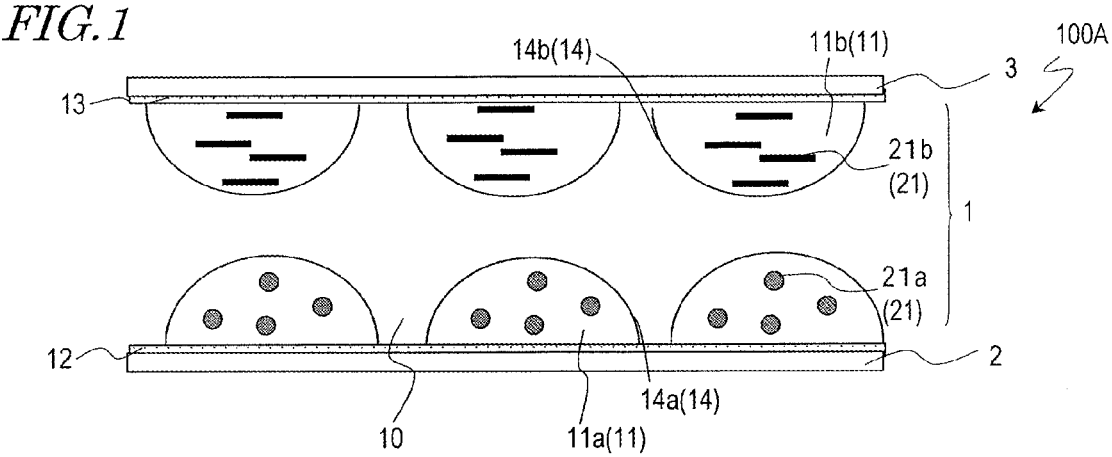
FIG. 1 A schematic cross-sectional view of a liquid crystal layer 1 of a liquid crystal display device 100A according to an embodiment of the present invention.
Figure 2:
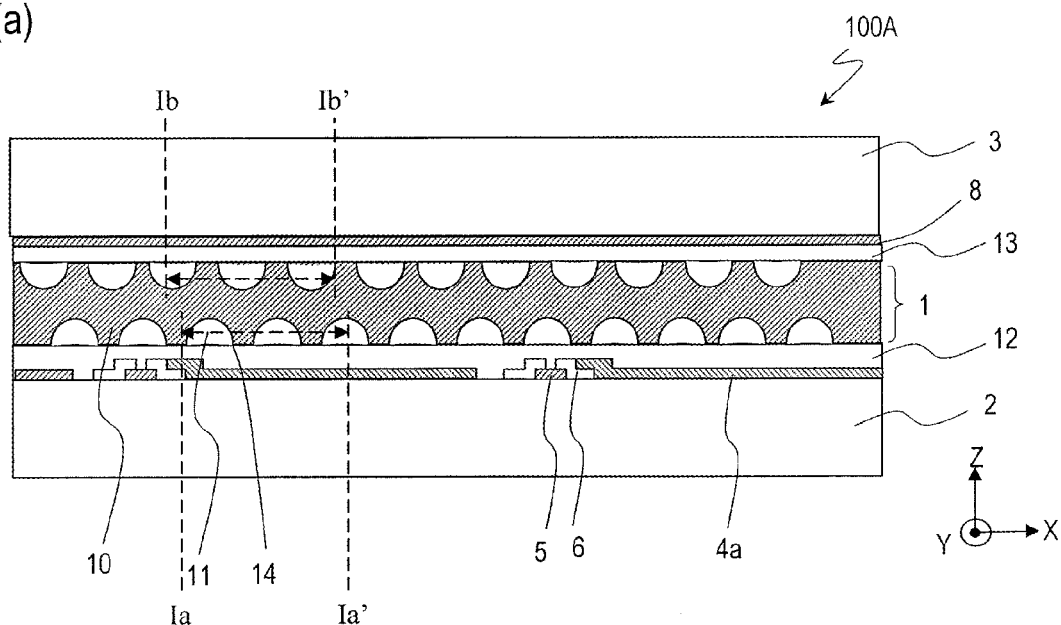
FIG. 2 (a) is a schematic cross-sectional view for illustrating the liquid crystal display device 100A. (b) is a schematic cross-sectional view taken along line Ia-Ia' of (a). (c) is a schematic cross-sectional view taken along line Ib-Ib' of (a).
Figure 2:
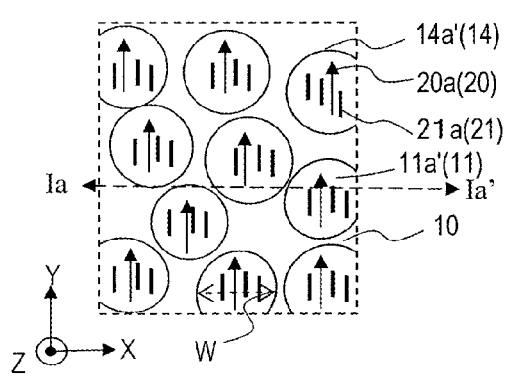
Figure 2:
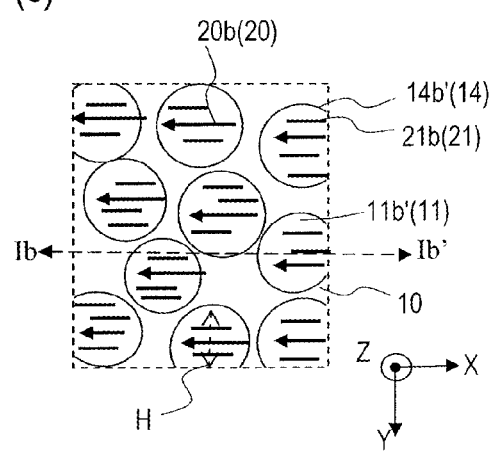

FIG. 1 is a cross-sectional view schematically showing the liquid crystal display device 100A.

As shown in FIG. 1, the liquid crystal display device 100A includes a first substrate 2 (e.g., a glass substrate), a second substrate 3 (e.g., a glass substrate) which is arranged so as to oppose the first substrate 2, and a liquid crystal layer 1 interposed between the first substrate 2 and the second substrate 3. Further, the first substrate 2 and the second substrate 3 are respectively provided with alignment films 12, 13 which are in contact with the liquid crystal layer 1. The alignment films 12, 13 are provided with, for example, a rubbing treatment such that the alignment azimuth of the liquid crystal molecules of the liquid crystal layer 1 which are in contact with the alignment films 12, 13 are defined. The alignment azimuth defined by the alignment film 12 and the alignment azimuth defined by the alignment film 13 are perpendicular to each other. The alignment azimuth may be defined by any other treatment than the rubbing treatment, such as a photo-alignment treatment.

The liquid crystal layer 1 includes small sections 14a which are separated by a wall 10 and the alignment film 12 and small sections 14b which are separated by the wall 10 and the alignment film 13. The continuous wall 10 is made of, for example, a polymer. Liquid crystal regions 11a are formed in the small sections 14a. Liquid crystal regions 11b are formed in the small sections 14b. Each of the liquid crystal regions 11a, 11b includes a nematic liquid crystal material (not shown) and a dichromatic dye (in the present embodiment, a dichromatic fluorescent dye) 21a, 21b. The nematic liquid crystal material and the dichromatic dye 21a in the liquid crystal regions 11a are in contact with the alignment film 12. The nematic liquid crystal material and the dichromatic dye 21b in the liquid crystal regions 11b are in contact with the alignment film 13. The nematic liquid crystal material and the dichromatic dye 21a of the liquid crystal regions 11a are aligned along the rubbing direction of the alignment film 12. The nematic liquid crystal material and the dichromatic dye 21b of the liquid crystal regions 11b are aligned along the rubbing direction of the alignment film 13. The dichromatic dye 21a, 21b is aligned parallel to the alignment azimuth of the nematic liquid crystal material.

As will be described later, to form the small sections 14a, 14b such that they are separated by the alignment films 12, 13 and the wall 10, it is preferred that the surface free energy of the alignment films 12, 13 is optimized. The present inventors reached this knowledge after conducting various examinations. The suitable range of the surface free energy is, for example, not less than 44 mJ/m$^2$ and not more than 50 mJ/m$^2$, although it depends on the material of the liquid crystal layer 1.

As described above, the nematic liquid crystal material and the dichromatic dye 21a, 21b form the small sections 14a, 14b so as to be in contact with the alignment films 12, 13, so that the alignment of the nematic liquid crystal material and the alignment of the dichromatic dye 21a, 21b can be controlled. As will be described later in detail, when the alignment of the dichromatic dye 21a, 21b is controlled such that the alignment azimuth of the dichromatic dye 21a and the alignment azimuth of the dichromatic dye 21b are perpendicular to each other, for example, absorption of light (for example, light at the wavelength of 430 nm) by the dichromatic dye 21a, 21b is efficiently achieved. Therefore, low voltage driving is possible, and the color producing property can be improved. Common dichromatic dye 21 absorbs or transmits light of a predetermined color according to the state of alignment of the dichromatic dye 21. When the dichromatic dye 21 is a dichromatic fluorescent dye, absorption of light (for example, light at the wavelength of 430 nm) is large, and a color of large emission intensity (deep color) can be realized. Further, of the light of fluorescent emission, light which is reflected at the interface between the first substrate 2 and the alignment film 12 and guided, for example, is effectively scattered, resulting in bright display. Note that, although it is preferred that the alignment azimuth of the dichromatic dye 21a and the alignment azimuth of the dichromatic dye 21b are perpendicular to each other, the above-described effects can be achieved so long as the angle between the alignment azimuth of the dichromatic dye 21a and the alignment azimuth of the dichromatic dye 21b is not more than 90°±35°. The above-described effects are large when the alignment azimuth of the dichromatic dye 21a and the alignment azimuth of the dichromatic dye 21b are within the angle between the azimuth of the director of the liquid crystal material and the azimuth of the absorption axis of dichromatic dye molecules. The angle between the azimuth of the director of the liquid crystal material and the azimuth of the absorption axis of dichromatic dye molecules, θ, is determined according to the formula of $S=(3(\cos\theta)^2-1)/2$ (S is the order parameter). In the present embodiment, the values of S of the liquid crystal materials containing the dichromatic dyes 21a and 21b are respectively not less than 0.5, and therefore, θ=±35.3° is obtained from the above formula.

Next, a specific configuration of the liquid crystal display device 100A is described with reference to FIG. 2. FIG. 2(a) is a schematic cross-sectional view for illustrating the liquid crystal display device 100A.

The liquid crystal display device 100A shown in FIG. 2(a) includes a plurality of switching elements 5 (here, thin film transistors) which are provided on the liquid crystal layer 1 side of the first substrate 2. The liquid crystal display device 100A further includes a plurality of transparent pixel electrodes 4a which are electrically coupled to respective ones of the plurality of switching elements 5, and an alignment film 12 which is in contact with the liquid crystal layer 1. The alignment film 12 is a horizontal alignment film and is provided with a rubbing treatment. The plurality of pixel electrodes 4a are arranged so as to be separated from one another and define pixels, each of which is a unit of displaying of images. In the present embodiment, these pixel electrodes 4a are in a matrix arrangement and are respectively electrically coupled to drain electrodes 6 of corresponding thin film transistors 5. The liquid crystal display device 100A further includes a transparent electrode 8 which is provided on the liquid crystal layer 1 side of the second substrate 3, and an alignment film 13 which is in contact with the liquid crystal layer 1. The alignment film 13 is also a horizontal alignment film, as is the alignment film 12, and is provided with a rubbing treatment. As described above, the alignment films 12, 13 are formed such that the rubbing direction of the alignment film 12 and the rubbing direction of the alignment film 13 are perpendicular to each other.

FIG. 2(b) and FIG. 2(c) are schematic plan views for illustrating the alignment direction of the dichromatic dye 21 (in the present embodiment, a dichromatic fluorescent dye) in the absence of an applied voltage. FIG. 2(b) is a schematic cross-sectional view taken along line Ia-Ia' of FIG. 2(a). FIG. 2(c) is a schematic cross-sectional view taken along line Ib-Ib' of FIG. 2(a).

As shown in FIG. 2(b) and FIG. 2(c), the liquid crystal layer 1 typically includes small sections 14a' and 14b' which are separated only by the wall 10 in addition to the above-described small sections 14a, 14b (not shown in FIG. 2(b) and FIG. 2(c)). The small sections 14a' has liquid crystal regions 11a'. The small sections 14b' has liquid crystal regions 11b'.

The liquid crystal regions 11a' include a nematic liquid crystal material (not shown) and a dichromatic dye 21a (in the present embodiment, a dichromatic fluorescent dye). The liquid crystal regions 11b' include a nematic liquid crystal material and a dichromatic dye 21b (in the present embodiment, a dichromatic fluorescent dye). In some cases, the liquid crystal layer 1 may include only the small sections 14a and 14b which are separated by the wall 10 and the alignment film 12 or the alignment film 13 and may not include the small sections 14a' and 14b' which are separated only by the wall 10.

As shown in FIG. 2(b), in the absence of an applied voltage, the long axis direction (director) 20a of the dichromatic dye 21a which is present in liquid crystal regions 11a and 11a' in the vicinity of the alignment film 12 is parallel to the column direction of the liquid crystal layer 1 when seen in a direction normal to the display plane of the liquid crystal display device 100A. As shown in FIG. 2(c), in the absence of an applied voltage, the long axis direction (director) 20b of the dichromatic dye 21b which is present in liquid crystal regions 11b and 11b' in the vicinity of the alignment film 13 is parallel to the row direction of the liquid crystal layer 1 when seen in a direction normal to the display plane of the liquid crystal display device 100A. That is, the director 20a and the director 20b are perpendicular to each other.

In the present embodiment, the density of the small sections 14 (i.e., the density of liquid crystal regions 11) is preferably 0.016 sections/$\mu m^2$ or higher and, more preferably, 1 section/$\mu m^2$ or higher. This is because the scattering intensity of the liquid crystal layer 1 increases as the density of the small sections 14 increases, so that a brighter white display state can be achieved. On the other hand, if one pixel includes too many small sections 14, the size of each small section 14 decreases, so that liquid crystal regions 11 which are not in contact with the alignment film 12, 13 are more likely to occur. Also, it is probable that the motion of the liquid crystal molecules becomes sluggish due to the interaction between the walls 10 of the small sections 14 and the liquid crystal molecules, so that the response speed decreases. Note that, when the liquid crystal layer 1 has a two-layer structure where the liquid crystal layer 1 includes the small sections 14a and 14b that are separated by the wall 10 and the alignment film 12 or the alignment film 13 and does not include the small sections 14a' and 14b' that are separated only by the wall 10, the density of either of the small sections 14a and 14b that are separated by the wall 10 and the alignment film 12 or the alignment film 13 in each layer is preferably 0.032 sections/$\mu m^2$ or higher. In this case, the density of the small sections 14 of the liquid crystal layer 1 is 0.064 sections/$\mu m^2$ or higher.

The average of length H of the small sections 14 along the thickness direction of the liquid crystal layer 1 (hereinafter, simply "average height $H_{AVE}$") is preferably not less than ⅓ and less than ⅔ of the thickness of the liquid crystal layer 1. If the average height $H_{AVE}$ of the small sections 14 is smaller than ⅓ of the thickness of the liquid crystal layer 1, liquid crystal regions 11 which are free of the effects of the alignment films 12, 13 are likely to occur in part of the liquid crystal layer 1 at the center of its thickness. Such liquid crystal regions 11 are generally surrounded by the wall 10 so as not to be in direct contact with the alignment films 12, 13. Therefore, the liquid crystal material of the liquid crystal regions 11 is not regulated by the alignment films 12, 13 so that the directors of the liquid crystal material are oriented in random directions. Thus, it is difficult to control the alignment of the liquid crystal material. If the average height $H_{AVE}$ of the small sections 14 is not less than ⅔ of the thickness of the liquid crystal layer 1, the small sections 14a and the small sections 14b are unlikely to coexist along the thickness direction of the liquid crystal layer 1. Even when the small sections 14a and the small sections 14b coexist, the size of the small sections 14a along the thickness direction (along a direction parallel to the thickness direction of the liquid crystal layer 1) and the size of the small sections 14b along the thickness direction are greatly different. If there is only one small section 14 along the thickness direction of the liquid crystal layer 1, or if the size of the small sections 14a along the thickness direction and the size of the small sections 14b along the thickness direction are greatly different, the efficiency of absorption of light will greatly decrease.

On the other hand, it is preferred that the average of the maximum width W of the small sections 14 in a plane of the liquid crystal layer 1 (hereinafter, simply "average width $W_{AVE}$") is generally equal to the average height $H_{AVE}$.

Preferably, the average height $H_{AVE}$ of the small sections 14 is appropriately selected within the range of, for example, not less than 0.6 μm and not more than 6 μm, while the average width $W_{AVE}$ is appropriately selected within the range of, for example, not less than 0.6 μm and not more than 6 μm. The reasons for these conditions are described below.

If the small sections 14 are excessively large, the number of small sections 14 per unit area in the display region (e.g., in one pixel (150 μm×150 μm)) would decrease. Accordingly, the density of the small sections 14 (i.e., the density of the liquid crystal regions 11 per unit area in the display region) would decrease so that high scattering characteristic cannot be obtained. Also, discontinuous alignment of the liquid crystal molecules, i.e., disclination, would more readily occur in the liquid crystal region 11 in each of the small sections 14. The response of the liquid crystal molecules to an applied voltage would become sluggish near the disclination of the liquid crystal region 11, and therefore, there is a probability that the response speed decreases. Thus, when the average diameter of the small sections 14 is not less than 0.6 μm and not more than 6 μm, occurrence of a disclination in the liquid crystal region 11 can effectively be prevented while securing the density of the liquid crystal regions 11.

On the other hand, if the average height $H_{AVE}$ or the average width $W_{AVE}$ of the small sections 14 is less than 0.6 μm, the effects of the interaction between the wall 10 of the small sections 14 and the liquid crystal molecules of the liquid crystal regions 11 would significantly increase so that the response of the liquid crystal molecules to an applied voltage would become sluggish. Also, the number of liquid crystal regions 11 which are not in contact with the alignment film 12, 13 is likely to increase, so that there is a probability that the scattering characteristic and the response speed cannot be sufficiently improved. Therefore, both the average height $H_{AVE}$ and the average width $W_{AVE}$ of the small sections 14 are preferably 0.6 μm or more.

The material of the liquid crystal layer 1 is not limited to any particular one, but the dielectric constant anisotropy of the nematic liquid crystal material of the liquid crystal layer 1 is preferably positive. Although the liquid crystal molecules are expected to incline so as to be in parallel with the substrate when the voltage is on, the direction of the inclination cannot be controlled if the dielectric anisotropy of the nematic liquid crystal material is negative and the alignment films that regulate the alignment of liquid crystal molecules of the nematic liquid crystal material are vertical alignment films, so that the molecules in the liquid crystal droplets cannot be homogeneously aligned. As a result, there is a probability that a disclination occurs in the liquid crystal region, or the motion of the liquid crystal molecules is impeded. To utilize the display principles which will be described later, the liquid crystal layer preferably does not contain a chiral agent. Further, the birefringence value Δn of the nematic liquid crystal material of the liquid crystal layer 1 (the difference between extraordinary refractive index ne and the ordinary refractive index no) is preferably not less than 0.1 and not more than 0.3. When the birefringence value Δn is 0.1 or greater, the contrast ratio of display can be increased. On the other hand, when the birefringence value Δn is 0.3 or smaller, there is a wide choice of materials, and a lower voltage and a higher response speed can be achieved.

The liquid crystal layer 1 of the present embodiment may be formed by preparing a mixture of a nematic liquid crystal material (i.e., low molecular weight liquid crystal composition) and a photocurable resin (monomer and/or oligomer) such that they are compatible with each other, providing the mixture between transparent substrates, and then polymerizing the photocurable resin. Although the type of the photocurable resin is not limited to any particular one, a UV-curable resin is preferably used. When the UV-curable resin is used, the above mixture need not to be heated during the polymerization, and therefore, adverse effects of the heat on other elements can be prevented. The monomer and oligomer may be monofunctional or polyfunctional.

In the present embodiment, the liquid crystal layer 1 is formed by photocuring a mixture of a UV-curable resin and a liquid crystal composition (liquid crystal mixture) by irradiation with active energy rays, such as ultraviolet rays. The liquid crystal mixture may be, for example, a liquid crystal mixture that exhibits a nematic liquid crystal phase at normal temperature, which may be prepared by mixing a UV-curable material and a liquid crystal in the proportion by weight of 20:80 and adding a small amount of photoinitiator to the mixture.

The above liquid crystal mixture is provided between a pair of substrates 2, 3 by, for example, a vacuum injection method or a One Drop Fill (ODF) method and then irradiate with ultraviolet. As a result of this, the UV-curable resin is polymerized to become a polymer which is phase-separated from the liquid crystal, whereby a liquid crystal layer 1 is formed which includes a wall 10 that is made of the polymer and a plurality of liquid crystal regions 11 separated by the wall 10.

Figure 3:
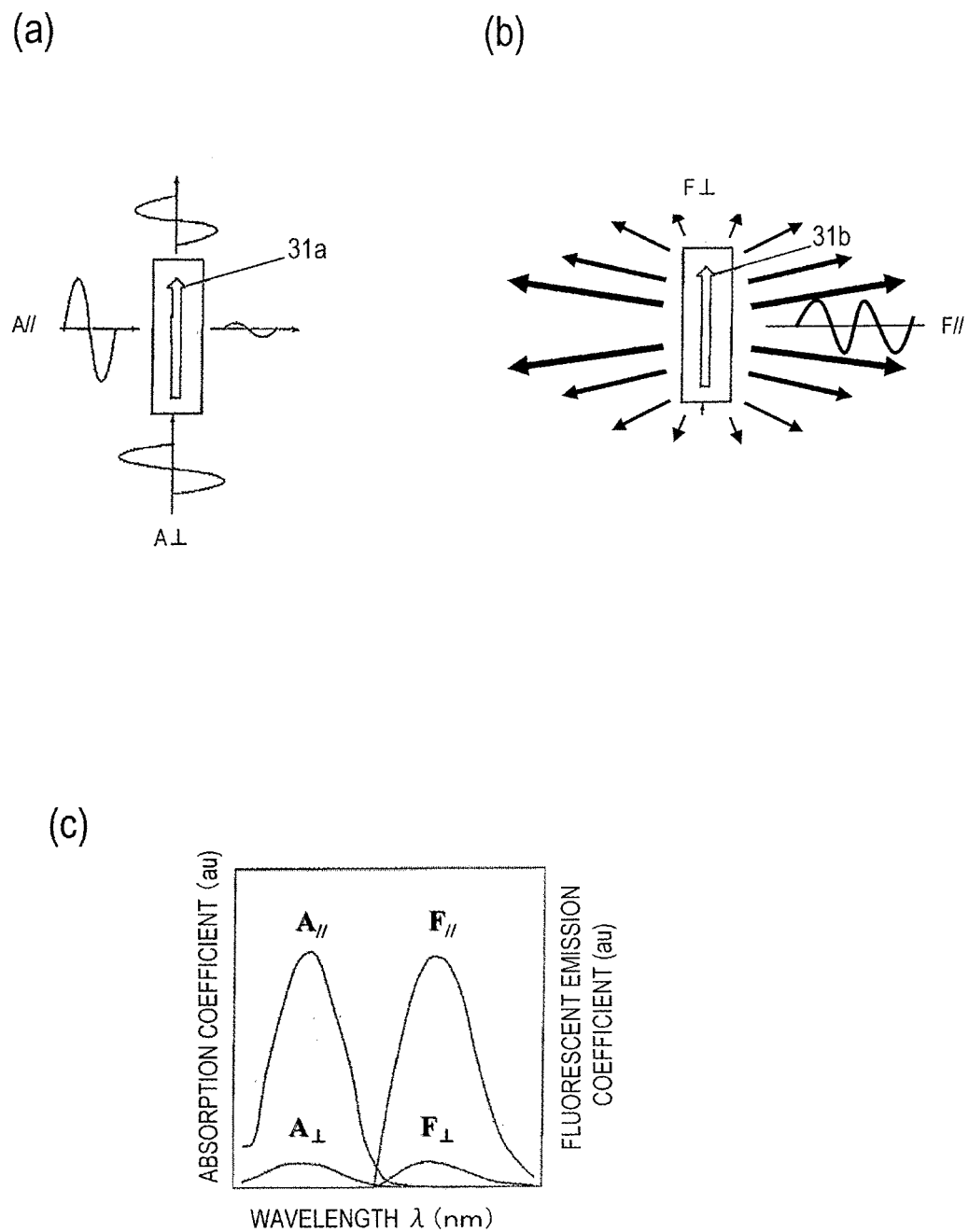
FIGS. 3 (a) and (b) are schematic diagrams for illustrating a dichromatic fluorescent dye. (c) is a graph for illustrating the relationship between the wavelength (λ) and the absorption coefficient and fluorescent emission coefficient for the dichromatic fluorescent dye.

Next, the dichromatic fluorescent dye is described with reference to FIG. 3. FIG. 3(a) and FIG. 3(b) are schematic diagrams for illustrating the dichromatic fluorescent dye. FIG. 3(c) is a graph for illustrating the dichromatic fluorescent dye. The dichromatic fluorescent dyes include p-type dichromatic fluorescent dyes and n-type dichromatic fluorescent dyes. In the present embodiment, a p-type dichromatic fluorescent dye is used.

As shown in FIG. 3(a) and FIG. 3(c), the p-type dichromatic fluorescent dye is such that the molecule axis and the transition moment of absorption (absorption axis) 31a are oriented in identical directions. Accordingly, the absorption coefficient of light which oscillates in a direction parallel to the molecule axis (A//) is greater than the absorption coefficient of light which oscillates in a direction perpendicular to the molecule axis (A⊥). The opposite applies to the n-type dichromatic fluorescent dye. Therefore, in the case where the p-type dichromatic fluorescent dye is aligned such that the absorption axis 31a is parallel to the substrate, the absorption efficiency of external light which is incident on the liquid crystal layer 1 is high. When there are two regions of which the absorption axes are perpendicular to each other in terms of the thickness direction of the liquid crystal layer 1 (see FIG. 1), all the polarization components of the external light can be efficiently absorbed.

As shown in FIG. 3(b) and FIG. 3(c), the p-type dichromatic fluorescent dye is such that the molecule axis and the transition moment of fluorescent emission (emission axis) 31b are oriented in substantially identical directions. Accordingly, the fluorescent emission coefficient of light which is emitted in a direction perpendicular to the molecule axis (F//) is greater than the fluorescent emission coefficient of light which is emitted in a direction parallel to the molecule axis (F⊥). The opposite applies to the n-type dichromatic fluorescent dye. Therefore, in the case where the p-type dichromatic fluorescent dye is aligned such that the emission axis 31b is parallel to the substrate, the fluorescent emission intensity is large when seen in a direction normal to the liquid crystal display device 100A.

Figure 4:
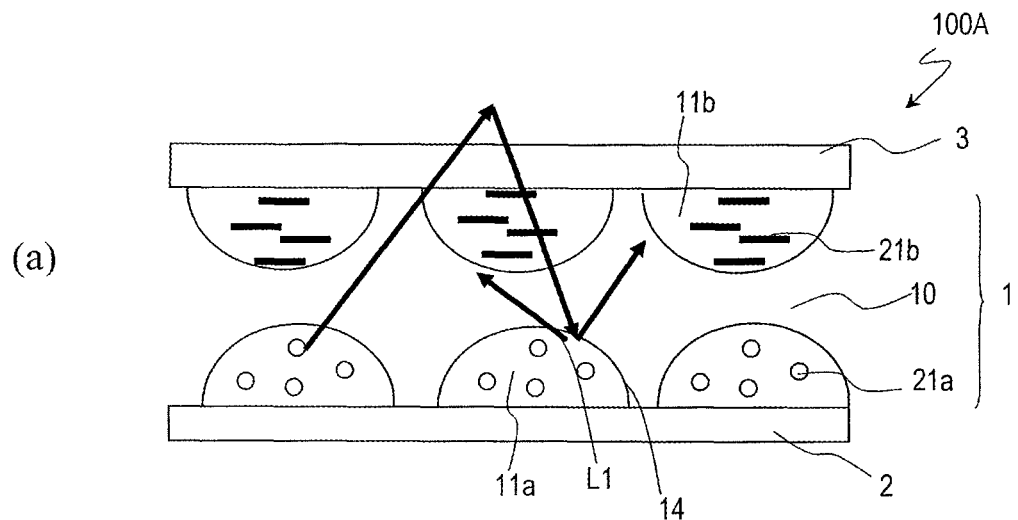
FIGS. 4 (a) and (b) are schematic cross-sectional views for illustrating an operation of the liquid crystal display device 100A.
Figure 4:
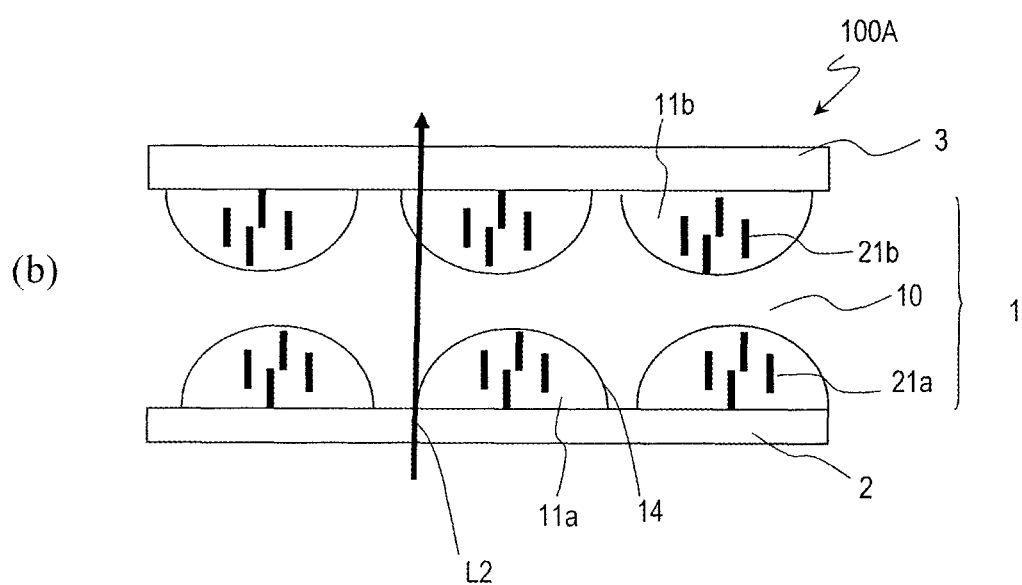

Next, the display principles of the liquid crystal display device 100A are described with reference to FIGS. 4(a) and 4(b). FIGS. 4(a) and 4(b) are schematic cross-sectional views for illustrating the display principles of the liquid crystal display device 100A. For the sake of simplicity, the components provided in the respective substrates 2, 3 are not shown in these drawings.

As shown in FIG. 4(a), in the absence of an applied voltage, the dichromatic dye 21a (in the present embodiment, a dichromatic fluorescent dye) in the liquid crystal regions 11a near the alignment film 12 is aligned parallel to the rubbing direction of the alignment film 12. Likewise, in the absence of an applied voltage, the dichromatic dye 21b (in the present embodiment, a dichromatic fluorescent dye) in the liquid crystal regions 11 near the alignment film 13 is aligned parallel to the rubbing direction of the alignment film 13. The nematic liquid crystal material has the extraordinary refractive index ne and the ordinary refractive index no. The polymer that forms the wall 10 has the refractive index np.

In the absence of an applied voltage, the dichromatic dye 21a, 21b and the nematic liquid crystal molecules (not shown) are aligned as described above. Of the light (non-polarized light) that is incident on the liquid crystal layer 1, light which oscillates parallel to the alignment azimuth of the dichromatic dye 21a is efficiently absorbed by the dichromatic dye 21a. Meanwhile, of the light (non-polarized light) that is incident on the liquid crystal layer 1, light which oscillates parallel to the alignment azimuth of the dichromatic dye 21b is efficiently absorbed by the dichromatic dye 21b. Further, of the light that is incident on the liquid crystal layer 1, for example, light which is not absorbed by the dichromatic dye 21a or 21b is refracted, and scattered, at the interface between the liquid crystal regions 11a and the wall 10, and then reflected by the interface between the second substrate 3 and the air layer so as to propagate toward the liquid crystal layer 1 side, before being absorbed by the dichromatic dye 21a. In this way, light is reflected or scattered by various interfaces which are present between the first substrate 2 and the second substrate 3, so that light which is incident on the liquid crystal layer 1 and which has a wavelength equal to the absorption wavelength of the dichromatic dyes 21a and 21b is generally entirely absorbed by the dichromatic dye 21a, 21b with high efficiency.

In the absence of an applied voltage, light L1 which is affected by the extraordinary refractive index ne of the nematic liquid crystal material (not shown) is intensively scattered by the interface between the wall 10 and the small section 14. In the case where a dichromatic fluorescent dye is used as in the present embodiment, light produced by fluorescent emission is linearly-polarized light which oscillates parallel to the dichromatic fluorescent dye molecules and the transition moment and is therefore efficiently scattered by the interface between a liquid crystal droplet which is aligned in the same direction as the alignment direction of the light-emitting molecules and the wall 10.

Light emitted from the dichromatic dye 21a is light which oscillates parallel to the alignment azimuth of the dichromatic dye 21a. On the other hand, light emitted from the dichromatic dye 21b is light which oscillates parallel to the alignment azimuth of the dichromatic dye 21b. Part of light emitted from the dichromatic dye 21a travels to the outside of the substrate without being modified, and at the outside, the light is perceived as emitted light. At the interface between the first substrate 2 and the air layer, light which is emitted in an angular direction that is equal to or greater than the total reflection angle is reflected by the interface between the first substrate 2 and the air layer and thereafter refracted at the interface between the liquid crystal region 11a and the wall 10. Since light emitted from the dichromatic dye 21a oscillates parallel to the alignment azimuth of the dichromatic dye 21a, the light is affected by the extraordinary refractive index ne of the liquid crystal material (not shown) in the liquid crystal region 11a and affected by the refractive index np of the wall 10 at the interface between the liquid crystal region 11a and the wall 10. Since the extraordinary refractive index ne of the liquid crystal region 11a and the refractive index np of the wall 10 have different values, light emitted from the dichromatic dye 21a is refracted (scattered) at the interface between the liquid crystal region 11a and the wall 10. Note that, however, at the interface between the liquid crystal region 11b and the wall 10, the light is affected by the ordinary refractive index no of the liquid crystal material in the liquid crystal region 11b. Since the ordinary refractive index no of the liquid crystal material and the refractive index np of the wall 10 have generally equal values, light is not scattered at the interface between the wall 10 and the liquid crystal region 11b.

As described above, light which is incident on the interface between the first substrate 2 and the air layer at an incidence angle that is equal to or greater than the total reflection angle is reflected and scattered at the interface between the liquid crystal region 11a and the wall 10. Light which is incident on the interface between the first substrate 2 and the air layer at an incidence angle that is equal to or smaller than the total reflection angle travels to the outside of the first substrate 2. Note that, since light emitted from the dichromatic dye 21b is affected by the refractive index np of the wall 10 and the extraordinary refractive index ne of the liquid crystal material in the liquid crystal region 11b, the light is mainly scattered at the interface between the liquid crystal region 11b and the wall 10.

On the other hand, as shown in FIG. 4(b), when a voltage which is not less than a predetermined value is applied across the liquid crystal layer 1, the dichromatic dye 21a, 21b in each of the liquid crystal regions 11a, 11b is aligned perpendicular to the substrate 2, 3. In this situation, for light incoming from the second substrate 3 side, the refractive index of the liquid crystal regions 11a, 11b is generally equal to the ordinary refractive index no of the nematic liquid crystal material. The present embodiment is designed such that the ordinary refractive index no of the nematic liquid crystal material is approximately equal to the refractive index np of the polymer that forms the wall 10 (no≈np). When the dichromatic dye 21a, 21b is in such a state of alignment, the dichromatic dye 21a, 21b does not absorb light which contributes to fluorescent emission (for example, light at the wavelength of 430 nm). Therefore, the dichromatic dye 21a, 21b does not emit fluorescent light, so that the liquid crystal layer 1 is in a light-transmitting state.

Thus, the alignment of the nematic liquid crystal material and the alignment of the dichromatic fluorescent dye are controlled, whereby display is realized with a fluorescence-scattering state and a light-transmitting state.

Next, a manufacturing method of the liquid crystal display device 100A is briefly described.

The liquid crystal display device 100A may be manufactured by, for example, a method described below. In an example described herein, the liquid crystal layer 1 is formed using a vacuum injection method.

First, surfaces of the first substrate 2 on which thin film transistors and pixel electrodes have been formed and the second substrate 3 on which a transparent electrode (counter electrode) 8 has been formed are coated using a spin coat method or an inkjet method to uniformly form alignment films 12, 13, which are then baked at a predetermine temperature. Thereafter, the alignment films 12, 13 undergo a rubbing treatment. The alignment films 12, 13 used herein are horizontal alignment films 12, 13 with the surface free energy of 47 mJ/m$^2$, which was measured by a method that will be described later.

Then, a photocurable monomer, a photoinitiator, a positive-type liquid crystal are uniformly mixed to prepare a liquid crystal mixture. The temperature during mixing is not less than temperature Tni at which the liquid crystal mixture transitions from a nematic phase to an isotropic phase. The liquid crystal constitutes 75 to 85% of the composition. The resultant mixture is maintained at a temperature not less than the transition temperature Tni.

Then, the first substrate 2 and the second substrate 3 are placed so as to oppose each other such that the alignment films are placed inside, and attached to each other via a spacer for securing a predetermined gap therebetween.

While these substrates 2, 3 are maintained at a temperature not less than the transition temperature Tni, a liquid crystal mixture maintained at a temperature not less than the transition temperature Tni is injected into the gap between the substrates (vacuum injection method). Thereafter, the mixture is irradiated with light (ultraviolet) at a temperature not less than the transition temperature Tni such that a polymer is produced from monomers contained in the mixture and that the polymer and the liquid crystal are phase-separated (which is called "polymerization-induced phase separation"). As a result, the liquid crystal layer 1 is formed between the first substrate 2 and the second substrate 3. In this way, the liquid crystal display device 100A is obtained.

In the above-described method, the vacuum injection method is used in the formation of the liquid crystal layer 1. However, an ODF method may be used instead. A method for forming the liquid crystal layer 1 in such a case is described below.

First, formation of the alignment films 12, 13 and preparation of a liquid crystal mixture are performed in the same way as in the case of using the vacuum injection method.

Then, the liquid crystal mixture of a predetermined amount, which is maintained at a temperature not less than the transition temperature Tni, is dropped on the alignment film 12, 13 of the first substrate 2 or the second substrate 3 maintained at a temperature not less than the transition temperature Tni. Thereafter, the other substrate is attached to the substrate 2, 3 on which the mixture has been dropped such that they oppose each other via a spacer.

Then, the liquid crystal mixture between the substrate is irradiated with light (ultraviolet) at a temperature not less than the transition temperature Tni, such that a polymer is produced from monomers contained in the mixture and that the polymer and the liquid crystal are phase-separated. In this way, the liquid crystal layer 1 is obtained.

In the case where the liquid crystal display device 100A is manufactured using the above-described method, the configuration of the liquid crystal layer 1, such as the size, shape, arrangement, etc., of the liquid crystal regions 11, can be controlled by the type of alignment films 12, 13 and the formation conditions for the liquid crystal layer 1, etc. As will be described below in detail, the size of the liquid crystal regions 11 can be adjusted by changing the irradiation conditions for the liquid crystal mixture. The arrangement of the liquid crystal regions 11 in the liquid crystal layer 1 can be adjusted by changing the type of the alignment films 12, 13.

As described above, the liquid crystal display device 100A can be manufactured by a method which is simple and convenient as compared with Patent Document 1.

Next, the relationship between the size of the liquid crystal regions 11 and the irradiation conditions for the liquid crystal mixture is described.

In the present embodiment, to improve the scattering characteristic of the liquid crystal layer 1, the size of the small sections 14 (i.e., the size of the liquid crystal regions 11) is preferably controlled to be within a predetermined range. In the case where a liquid crystal mixture which is similar to that employed in the above-described method is used to form the liquid crystal layer 1, the size of the liquid crystal regions 11 can be adjusted by changing the irradiation conditions for the liquid crystal mixture. The present inventors examined the relationship between the irradiation conditions and the size of the liquid crystal regions 11. The procedure and results of the examination are described below.

First, an ITO film and an alignment film 12, 13 are formed in this order on the surfaces of two substrates 2, 3, and then, a liquid crystal mixture is injected between these substrates 2, 3 using a vacuum injection method. The method for forming the alignment films 12, 13 and the materials and mixing ratio of the liquid crystal mixture are the same as those described above. Then, the liquid crystal mixture injected between the substrates 2, 3 is irradiated so as to undergo polymerization-induced phase separation, whereby the liquid crystal layer 1 is formed. The irradiation intensity is selected within the range of 2 mW/cm$^2$ to 140 mW/cm$^2$. Note that the light used for irradiation may be light transmitted through a filter that is configured to remove the wavelengths of 340 nm or less, for example. Irradiation with light at 340 nm or less may cause a problem such as decomposition of the liquid crystal contained in the liquid crystal mixture.

The duration of the irradiation is a sufficient period of time for monomers contained in the liquid crystal mixture to be polymerized. Here, the duration of the exposure may be set such that the temperature of the nematic liquid crystal material of the liquid crystal regions 11 is about 99% or more of the phase transition temperature Tni of the liquid crystal which is contained in the liquid crystal mixture as a source material. For example, for the irradiation intensity of 50 mW/cm$^2$, the irradiation duration is 50 sec.

The size of the small sections 14 in the liquid crystal display device 100A is obtained by SEM observation. Specifically, the liquid crystal display device 100A is disassembled, and the liquid crystal in the small sections 14 is washed away with an organic solvent. Then, the second substrate 3 is peeled away from the resultant liquid crystal display device 100A, and a thin conductive film is formed by sputtering. Thereafter, the small sections 14 in the liquid crystal layer 1 are observed from the above. Here, for a plurality of (e.g., 100) small sections 14 included in one pixel, the maximum width of each small section 14 is measured, and the average of the maximum widths (average width), $W_{AVE}$, is calculated.

The results of the SEM observation were compared with results of microscopic observation of the liquid crystal display device 100A before the disassembling of the device with the use of an optical microscope. It was confirmed by the comparison that the SEM-observed shape and arrangement of the small sections 14 were identical to the shape and arrangement of the liquid crystal regions 11 in the liquid crystal display device 100A before the disassembling of the device. Thus, it is inferred that the average width $W_{AVE}$ of the small sections which was obtained by SEM observation is equal to the average width of the liquid crystal regions 11 formed in the small sections 14.

It was confirmed that the average width $W_{AVE}$ of the small sections 14 (i.e., the average width of the liquid crystal regions) which was obtained by SEM observation depends on the intensity of light for irradiation of the liquid crystal mixture. It was seen from the results that the size of the liquid crystal regions 11 increases as the irradiation intensity decreases, and the size of the liquid crystal regions 11 decreases as the irradiation intensity increases. Hence, it was confirmed that the size of the liquid crystal regions 11 can be controlled by the irradiation intensity. It was also found that, to control the average width of the liquid crystal regions 11 so as to be generally 2 µm or less, the irradiation intensity may be 50 mW/cm$^2$ or more. Note that the numeric range of the irradiation intensity depends on the materials and mixing ratio of the liquid crystal mixture used.

Although in the example described herein we calculated the average width of the liquid crystal regions 11, the average height of the liquid crystal regions 11 can also be controlled by the irradiation conditions, as the average width of the liquid crystal regions 11 can be, so long as it is not more than the thickness of the liquid crystal layer 1 (e.g., 4 µm). Note that, if the liquid crystal regions 11 are large so that each liquid crystal region 11 extends across the entire thickness of the liquid crystal layer 1, the average height of the liquid crystal regions 11 depends on the thickness of the liquid crystal layer 1 and is therefore constant irrespective of the irradiation conditions.

Next, a method for measuring the surface free energy of the alignment films is described.

In the measurement, the average contact angle of a probe solution is measured by a sessile drop method using a solid-liquid interface analyzer (DropMaster500) manufactured by Kyowa Interface Science Co., Ltd. As the probe solution, water, ethylene glycol, and diiodomethane are used. The surface free energies of these probe solutions are, respectively, 72.8 mJ/m$^2$, 47.7 mJ/m$^2$, and 50.8 mJ/m$^2$. Specifically, the above probe solutions are dispensed in the form of a drop of about 30 µL on the surfaces of the respective alignment films for measuring the contact angle. The average of 10 measurements of the contact angle is calculated to obtain the "average contact angle" for each of the probe solutions. Thereafter, the surface free energies of the alignment films are obtained by an analysis based on the Kitazaki-Hata method using a FAMAS surface free energy analysis add-in software which is an accompaniment of the measurement apparatus. Such a method was used to evaluate the surface free energy of the alignment films, and the relationship between the surface free energy of the alignment films and formation of the small sections 14 of the liquid crystal layer 1 was examines.

As a result, as described above, it was found that, when the surface free energy of the alignment films is set to, for example, not less than 44 mJ/m$^2$ and not more than 50 mJ/m$^2$ (analyzed by the Kitazaki-Hata method), the liquid crystal layer 1 is obtained which includes the small sections 14a, 14b that are separated by the alignment films 12, 13 and the wall as shown in FIG. 1. Further, the proportion of liquid crystal regions 11 which are not regulated by the alignment films 12, 13 can be reduced, and the scattering efficiency of the liquid crystal layer 1 can be increased.

Next, the optical characteristics of the liquid crystal display device 100A are described with reference to FIG. 5 and FIG. 6.

The transmittance of the liquid crystal display device 100A and a liquid crystal display device 200 was measured for respective light-receiving angles. The liquid crystal display device 100A and the liquid crystal display device 200 had the same constituents except that the alignment films 12, 13 were different. The liquid crystal display device 100A included horizontal alignment films with the surface free energy of 47 mJ/m$^2$. The liquid crystal display device 200 included horizontal alignment films with the surface free energy being out of the range of not less than 44 mJ/m$^2$ and not more than 50 mJ/m$^2$. The intensity of ultraviolet light for irradiation (exposure illuminance) for formation of the liquid crystal layer 1 of the liquid crystal display devices 100A, 200 was 18 mW/cm$^2$ (wavelength: 365 nm). The thickness of the liquid crystal layer 1 was 5 μm.

Each of the liquid crystal display devices 100A, 200 was supplied with light incoming from the normal direction at the second substrate 3 side. The distribution of the scattering angles of light which was scattered by the liquid crystal layer 1 to outgo at the second substrate 3 side (backward scattered light) was measured. In the measurement, an LCD evaluation apparatus manufactured by Otsuka Electronics Co., Ltd. (LCD5200) was used.

Figure 5:
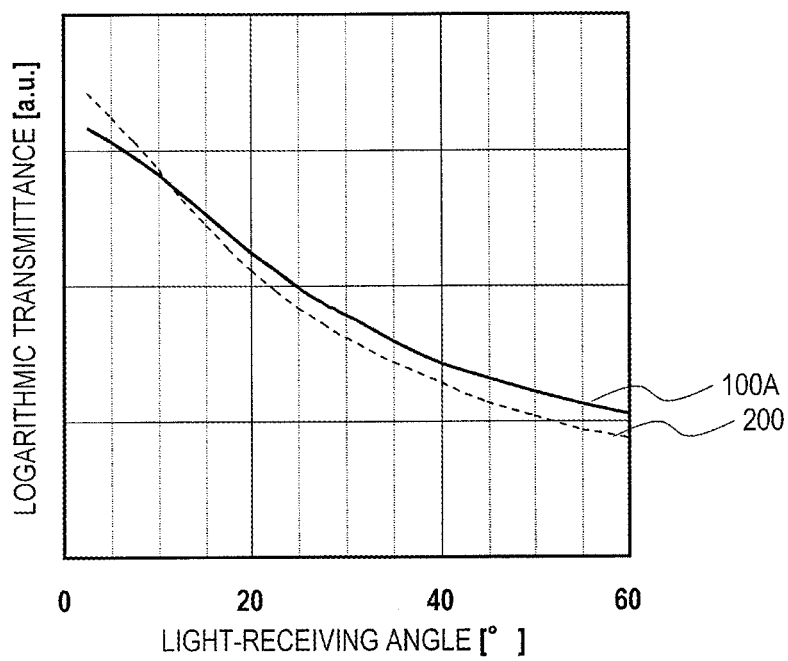
FIG. 5 A graph for illustrating the relationship between the light-receiving angle and the logarithmic transmittance in the liquid crystal display device 100A and a liquid crystal display device 200.

The measurement results are shown in FIG. 5. In the graph shown in FIG. 5, the horizontal axis represents the light-receiving angle of light scattered by the liquid crystal layer 1 of each of the liquid crystal display devices 100A, 200, which is specifically expressed by the absolute value of an angle between the light-receiving direction and a direction normal to the substrate. The vertical axis is the logarithmic representation of the intensity rate (transmittance) of light scattered by the liquid crystal layer 1 of each of the liquid crystal display devices 100A, 200.

As clearly seen from the results shown in FIG. 5, the transmittance of scattered light which was observed at a light-receiving angle of not less than about 10° was higher in the liquid crystal display device 100A than in the liquid crystal display device 200. The transmittance of non-scattered light which was observed at a light-receiving angle of not more than 10° was lower in the liquid crystal display device 100A than in the liquid crystal display device 200. It was found that, even though the same materials, the same thickness, and the same exposure illuminance were employed for the liquid crystal layer 1 in the liquid crystal display devices 100A, 200, the liquid crystal display device 100A had better scattering characteristics and was capable of realizing a brighter white display state than the liquid crystal display device 200.

The inventors evaluated the liquid crystal display devices 100A, 200 with or without the dichromatic fluorescent dye and measured the transmittance of the dichromatic fluorescent dye itself. In each of the liquid crystal display devices 100A, 200, light was supplied from the normal direction on the second substrate 3 side so as to be scattered by the liquid crystal layer 1. Part of the scattered light traveling to the first substrate 2 side (frontward scattered light) was received and scattered by a scattering sphere. The intensity rate (transmittance) of the light scattered by the scattering sphere was measured. In the measurement, a U-1400 spectrophotometer manufactured by Hitachi, Ltd. was used.

Figure 6:
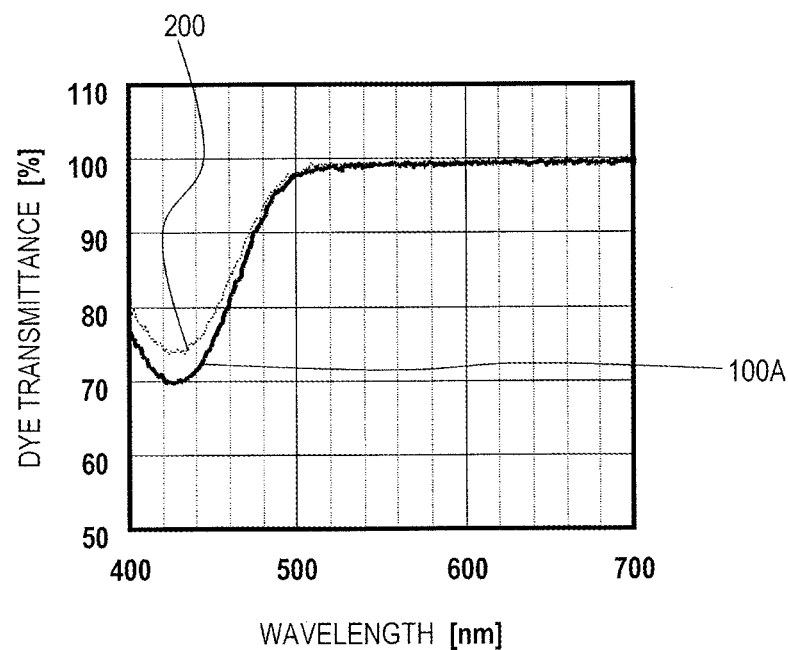
FIG. 6 A graph for illustrating the relationship between the wavelength of light and the dye transmittance in the liquid crystal display device 100A and the liquid crystal display device 200.

The measurement results are shown in FIG. 6. In the graph shown in FIG. 6, the horizontal axis represents the wavelength of light scattered by the liquid crystal layer 1 of each of the liquid crystal display devices 100A, 200, and the vertical axis represents the transmittance of the dichromatic fluorescent dye.

As clearly seen from the results shown in FIG. 6, comparing the transmission spectra of the frontward scattered light, the absorbing rate of the dichromatic fluorescent dye for light (for example, light at the wavelength of 430 nm) was higher in the liquid crystal display device 100A than in the liquid crystal display device 200, even though the same materials, the same thickness, and the same exposure illuminance were employed for the liquid crystal layer 1 in the liquid crystal display devices 100A, 200.

Then, in each of the liquid crystal display devices 100A, 200, light is supplied from the normal direction on the second substrate 3 side so as to be scattered by the liquid crystal layer 1. The SCE (specular component excluded) reflectance of the aggregate of part of the scattered light traveling to the second substrate 3 side (backward scattered light) and the fluorescent emission of the dichromatic fluorescent dye was measured. In the measurement, a CM2002 apparatus manufactured by Konica Minolta, Inc. was used.

Figure 7:
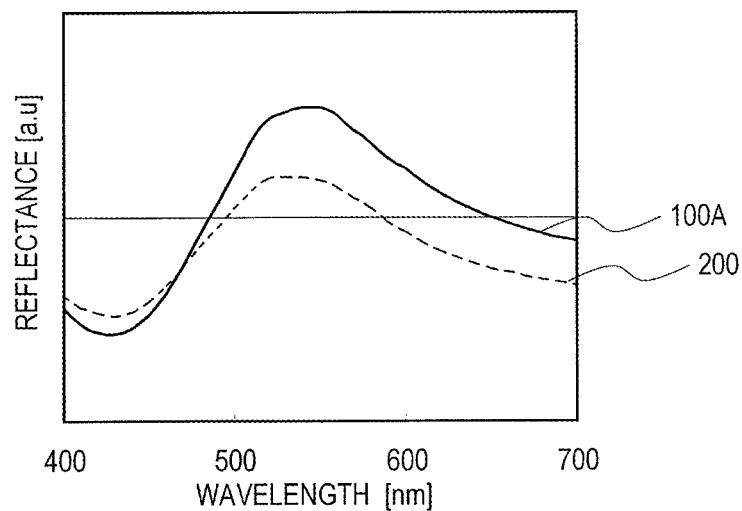
FIG. 7 A graph for illustrating the relationship between the wavelength of light and the reflectance in the liquid crystal display device 100A and the liquid crystal display device 200.

The measurement results are shown in FIG. 7. In the graph shown in FIG. 7, the horizontal axis represents the wavelength, and the vertical axis represents the SCE reflectance.

As clearly seen from the results shown in FIG. 7, the SCE reflectance at the emission wavelength (near 540 nm) was larger and the reflectance at a wavelength absorbed by the dichromatic fluorescent dye (near 430 nm) was lower in the liquid crystal display device 100A than in the liquid crystal display device 200, even though the same materials, the same thickness, and the same exposure illuminance were employed for the liquid crystal layer 1 in the liquid crystal display devices 100A, 200. This is because, as clearly seen from the above-described measurement results, the liquid crystal display device 100A had greater scattering efficiency and greater absorbing efficiency than the liquid crystal display device 200.

It is inferred from the above measurement results that, in the liquid crystal layer 1 of the liquid crystal display device 100A, the nematic liquid crystal material and the dichromatic fluorescent dye in almost all of the liquid crystal regions 11 are aligned along the direction of the alignment treatment of the alignment films 12, 13, whereas in the liquid crystal layer 1 of the liquid crystal display device 200, there are some liquid crystal regions 11 in which the nematic liquid crystal material and the dichromatic fluorescent dye are not aligned along the direction of the alignment treatment of the alignment films 12, 13, so that the scattering efficiency and the absorbing efficiency of the liquid crystal layer 1 decrease.

Next, liquid crystal display devices 100B and 100C of other embodiments of the present invention, which have the same effects as those of the liquid crystal display device 100A, are described with reference to FIG. 8 and FIG. 9. Components that are identical with those of the liquid crystal display device 100A are denoted by the same reference numerals.

Firstly, the liquid crystal display device 100B is described with reference to FIG. 8.

Figure 8:
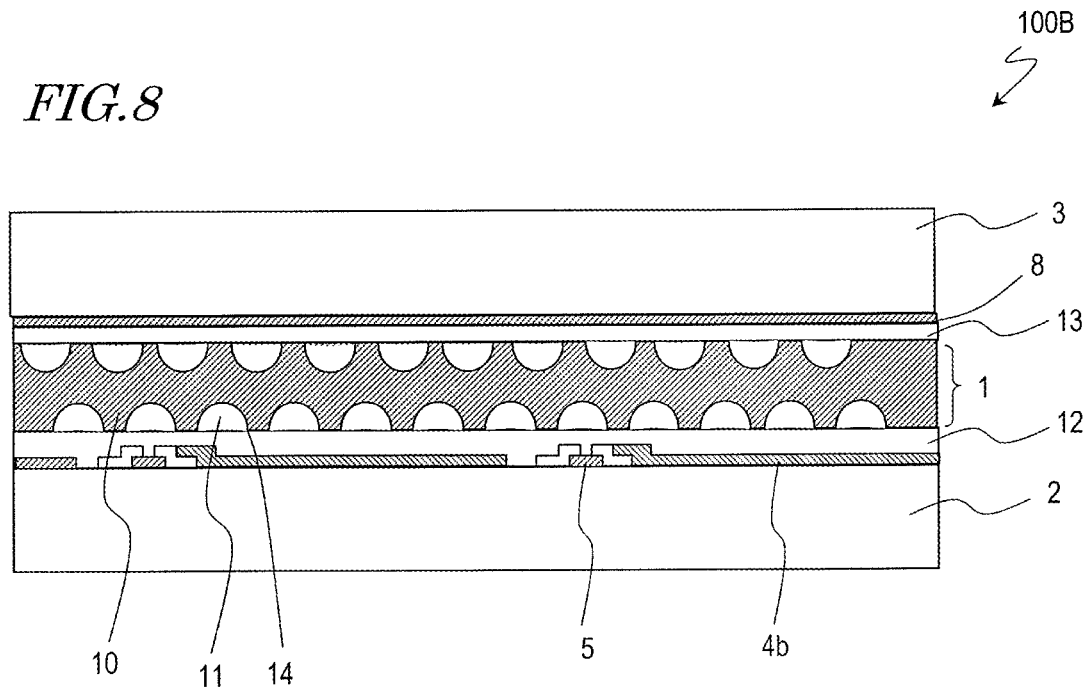
FIG. 8 A schematic cross-sectional view of a liquid crystal display device 100B according to another embodiment of the present invention.

The liquid crystal display device 100B shown in FIG. 8 is a liquid crystal display device which includes a reflective electrode 4b that is configured to reflect visible light in place of the transparent electrode 4a of the liquid crystal display device 100A. The reflective electrode 4b is made of, for example, Al (aluminum). Alternatively, the reflective electrode 4b may be made of Ag (silver).

The liquid crystal display device 100B enables switching of the display state between the mirror surface (in the presence of an applied voltage) and the colored scattering display (in the absence of an applied voltage).

Next, the liquid crystal display device 100C is described with reference to FIG. 9.

Figure 9:
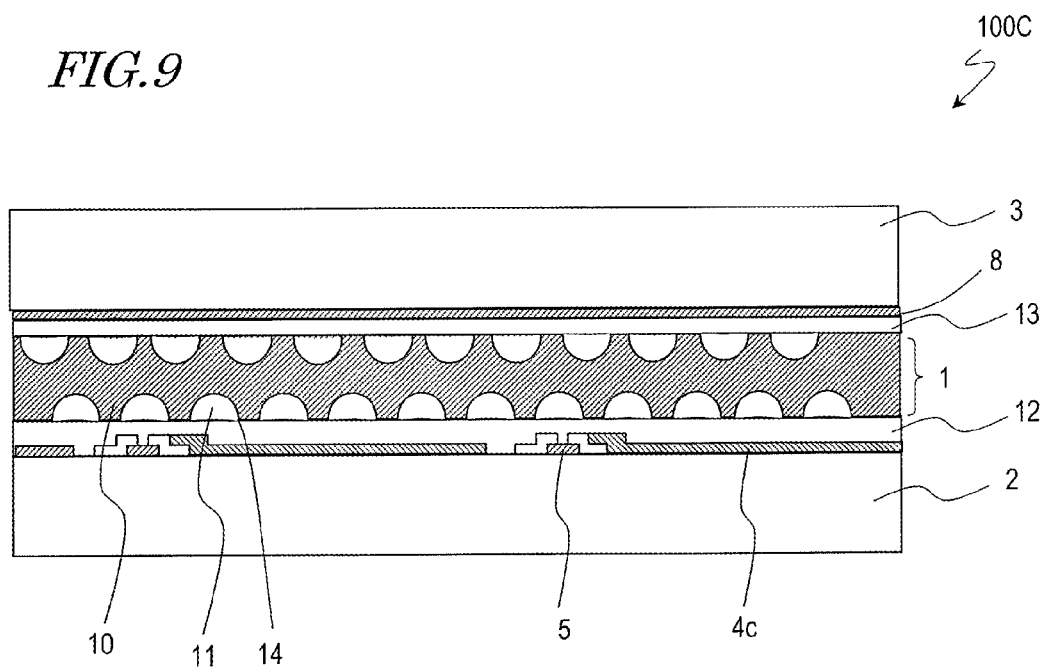
FIG. 9 A schematic cross-sectional view of a liquid crystal display device 100C according to still another embodiment of the present invention.

The liquid crystal display device 100C shown in FIG. 9 is a liquid crystal display device which includes a scatter reflection electrode 4c that is configured to reflect and scatter visible light in place of the transparent electrode 4a of the liquid crystal display device 100A. The scatter reflection electrode 4c includes, for example, a reflective electrode which is configured to reflect visible light (for example, an electrode which is made of Al) and a scattering layer which has the function of scattering visible light. Alternatively, the scatter reflection electrode 4c may be formed by a known method.

The liquid crystal display device 100C enables switching of the display state between the white scattering display (in the presence of an applied voltage) and the colored scattering display (in the absence of an applied voltage).

Next, a liquid crystal display device 100D of still another embodiment of the present invention, which has the same effects as those of the liquid crystal display device 100A, is described with reference to FIG. 10 to FIG. 14. Note that the liquid crystal display device 100D has a relation to a liquid crystal display device disclosed in WO 2010/134236. The entire disclosures of WO 2010/134236 are incorporated by reference in this specification.

Figure 10:
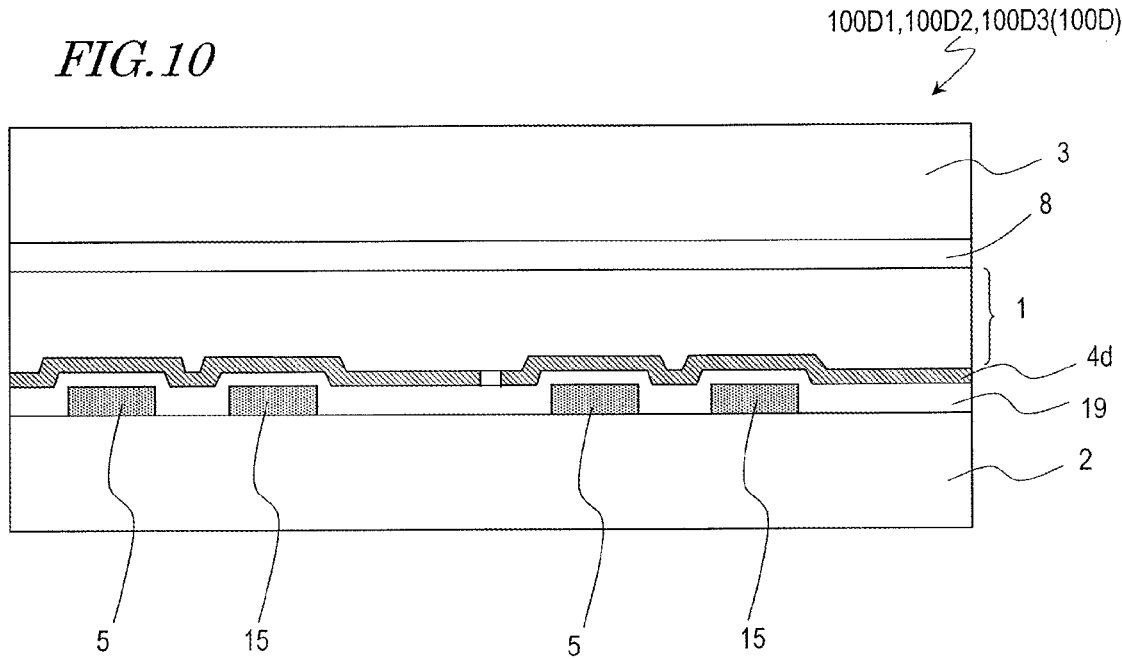
FIG. 10 A schematic cross-sectional view of a liquid crystal display device 100D according to still another embodiment of the present invention.

FIG. 10 is a schematic cross-sectional view of the liquid crystal display device 100D (100D1 to 100D3). The liquid crystal display device 100D is a reflective liquid crystal display device. Note that, in FIG. 10, the wall 10, the liquid crystal regions 11, and the alignment films 12, 13 are not shown. The liquid crystal display device 100D includes a first substrate 2 and a second substrate 3. The liquid crystal display device 100D further includes the above-described liquid crystal layer 1 that is provided between the first substrate 2 and the second substrate 3. The first substrate 2 is provided with TFTs 5 and wires 15. An interlayer insulating film 19 is provided so as to cover the TFTs 5 and the wires 15. On the interlayer insulating film 19, scatter reflection electrodes 4d are provided for respective pixels. The scatter reflection electrodes 4d are electrically coupled to the drain electrodes (not shown) of the TFTs 5. The interlayer insulating film 19 is made of a photosensitive organic resin.

The scatter reflection electrodes 4d have unevenness which is capable of scattering light. The difference between the highest portion and the lowest portion of the unevenness is not less than 100 nm and not more than 500 nm. In the liquid crystal display device 100D, due to the TFTs 5 and the wires 15 on the first substrate 2 side of the interlayer insulating film 19, the interlayer insulating film 19 has unevenness, and accordingly, the scatter reflection electrodes 4d also have unevenness. This configuration enables the scatter reflection electrodes 4d to have unevenness without adding an element or step. Therefore, increase of the manufacturing cost can be prevented. According to the evaluation of the reflection of external images which will be described later, to appropriately obtain scattering of light by the scatter reflection electrodes 4d, it is preferred that the difference between the highest portion and the lowest portion of the unevenness of the scatter reflection electrodes 4d is in the range of 100 nm to 500 nm. When the thickness of the interlayer insulating film 19 is increased, the unevenness that is attributed to the TFTs 5 and the wires 15 is moderated, so that the difference between the highest portion and the lowest portion of the unevenness decreases. If the thickness of the interlayer insulating film 19 is decreased, the difference between the highest portion and the lowest portion of the unevenness will be excessively large. Usually, the maximum level difference between the TFTs 5 and wires 15 and the first substrate 2 is about 1.5 μm. Therefore, the thickness of the interlayer insulating film 19 is preferably not less than 1.5 μm. As will be described later in detail, the thickness of the interlayer insulating film 19 is preferably not less than 1.5 μm and not more than 3.5 μm, and more preferably not less than 2.5 μm and not more than 3.5 μm.

Since the unevenness that is attributed to the TFTs 5 and the wires 15 contributes to formation of the unevenness of the scatter reflection electrodes 4d, if the area of a region occupied by the TFT 5 and the wire 15 in one pixel is small, the area of a portion in which external light is scattered will be small, and therefore, sufficient scattering cannot be obtained. Thus, it is preferred that the area of the region occupied by the TFT 5 and the wire 15 is not less than ⅓ of the area of the pixel. In the case where the area of the region occupied by the TFT 5 and the wire 15 is less than ⅓ of the area of the pixel, a portion of the interlayer insulating film 19 in a region in which none of the TFT 5 and the wire 15 is provided is partially patterned by photolithography, for example, such that the unevenness is formed in the interlayer insulating film 19, whereby the area of a region which is capable of scattering light can be increased.

The liquid crystal display device 100D improves the legibility of displayed characters, and the like, and accordingly improves the display quality.

Next, the liquid crystal display devices 100D1 to 100D3 are described with reference to FIG. 11 and FIG. 12.

Figure 11:
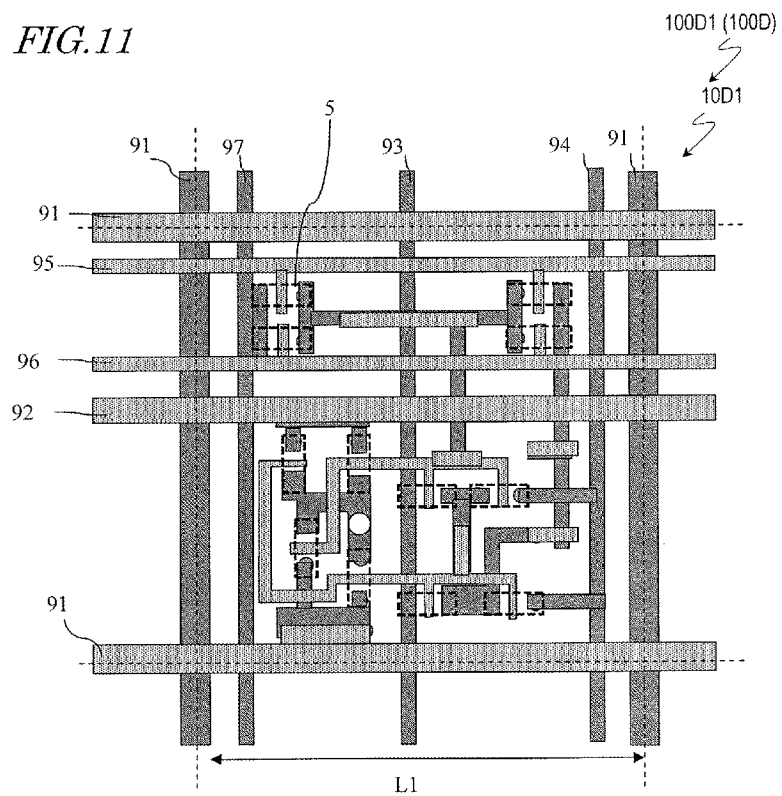
FIG. 11 A schematic plan view of a semiconductor device 10D1 of a liquid crystal display device 100D1.

FIG. 11 is a schematic plan view of a semiconductor device 10D1 of the liquid crystal display device 100D1. A region surrounded by VLA wires 91 extending in the column direction and the row direction forms one pixel. Each pixel includes twelve TFTs 5. These TFTs 5 form two static RAMs (Random Access Memories). In the semiconductor device 10D1, the TFTs 5 and a plurality of wires are provided across substantially the entire region of the pixel. A Vdd wire 93 and a Vss wire 94 are wires for supplying the power for the static RAMs. A GL wire 95 and a GLB wire 96 are wires of the ground potential. A SL wire 97 is a wire for supplying an image signal. The scatter reflection electrode 4d is coupled to the VLA wires 91 or VLB wires 92 according to the signal of the SL wire 97. When the scatter reflection electrode 4d is coupled to the VLA wires 91, the potential of the reflective electrode is 0 V. When the scatter reflection electrode 4d is coupled to the VLB wires 92, the potential of the reflective electrode is 5 V.

After formation of the TFTs 5, a 2.5 μm thick acrylic interlayer insulating film 19 was formed, and a scatter reflection electrode 4d was formed of Al. The thickness of the scatter reflection electrode 4d is, for example, 100 nm. Further, a parallel alignment film is provided on the scatter reflection electrode 4d, and in this situation, measurement of the reflection characteristics of the scatter reflection electrode 4d was carried out.

Figure 12:
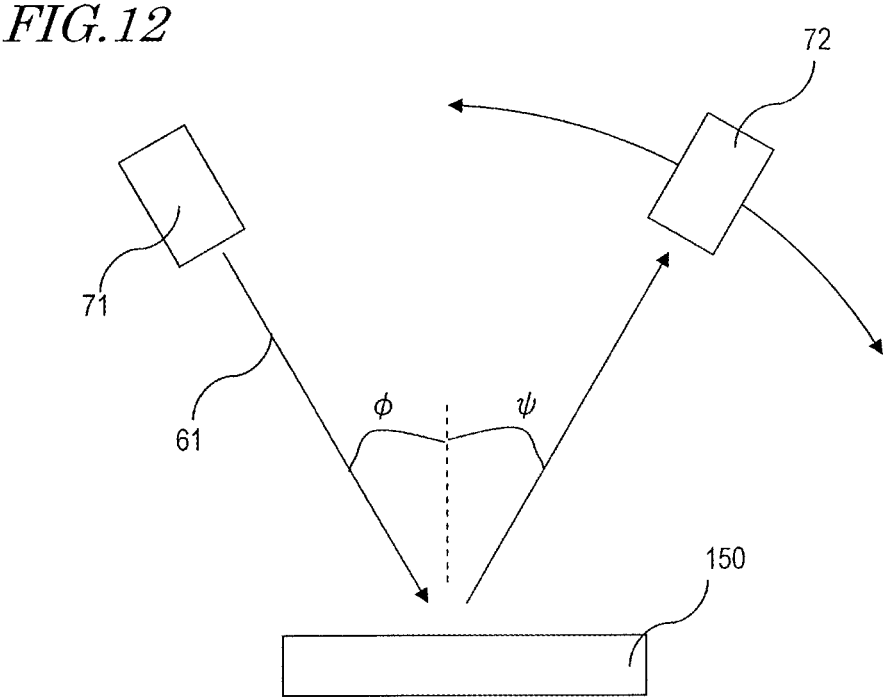
FIG. 12 A diagram for illustrating a method for measuring the reflection characteristics.

The measurement of the reflection characteristics was carried out using an apparatus shown in FIG. 12. FIG. 12 is a diagram for illustrating the measurement of the reflection characteristics.

A measurement object 150 (for example, the scatter reflection electrode 4d) was irradiated with collimated light 61 which was supplied from a light source 71 in a direction of −30° (φ) with respect to the normal direction of the measurement object 150 (where the clockwise direction is the positive direction, and the counterclockwise direction is the negative direction). The output of a photodetector 72 for reflected light was measured with the position of the photodetector 72 being varied in the range of 0° to 50° including specular reflection) 0≤Ψ≤50°) with respect to the normal direction of the measurement object 150. In the measurement, the light-receiving lens used had a power of 2.5. The measurement spot diameter was 2 mmφ.

Then, the liquid crystal display device 100D1 was manufactured using the semiconductor device 10D1 by a known method. The thickness of the liquid crystal layer 1 of the liquid crystal display device 100D1 was 3 μm. The liquid crystal layer 1 was formed by vacuum injection of a liquid crystal material (PNM-170 manufactured by DIC Corporation) and a dichromatic dye 21. Further, in formation of the liquid crystal layer 1, the liquid crystal layer 1 was irradiated for two minutes with ultraviolet light at the intensity of 50 mW/cm$^2$ (wavelength: 365 nm) from a UV-exposure apparatus fitted with a D-valve manufactured by Fusion Corporation.

The thus-manufactured liquid crystal display device 100D1 was driven to display characters, and the display and the degree of reflection of external images were visually checked. The integrating sphere reflectance excluding the specular reflection while the liquid crystal layer 1 was in the light-transmitting state was measured using the CM2002 apparatus manufactured by Konica Minolta, Inc. in the SCE mode.

Figure 13:
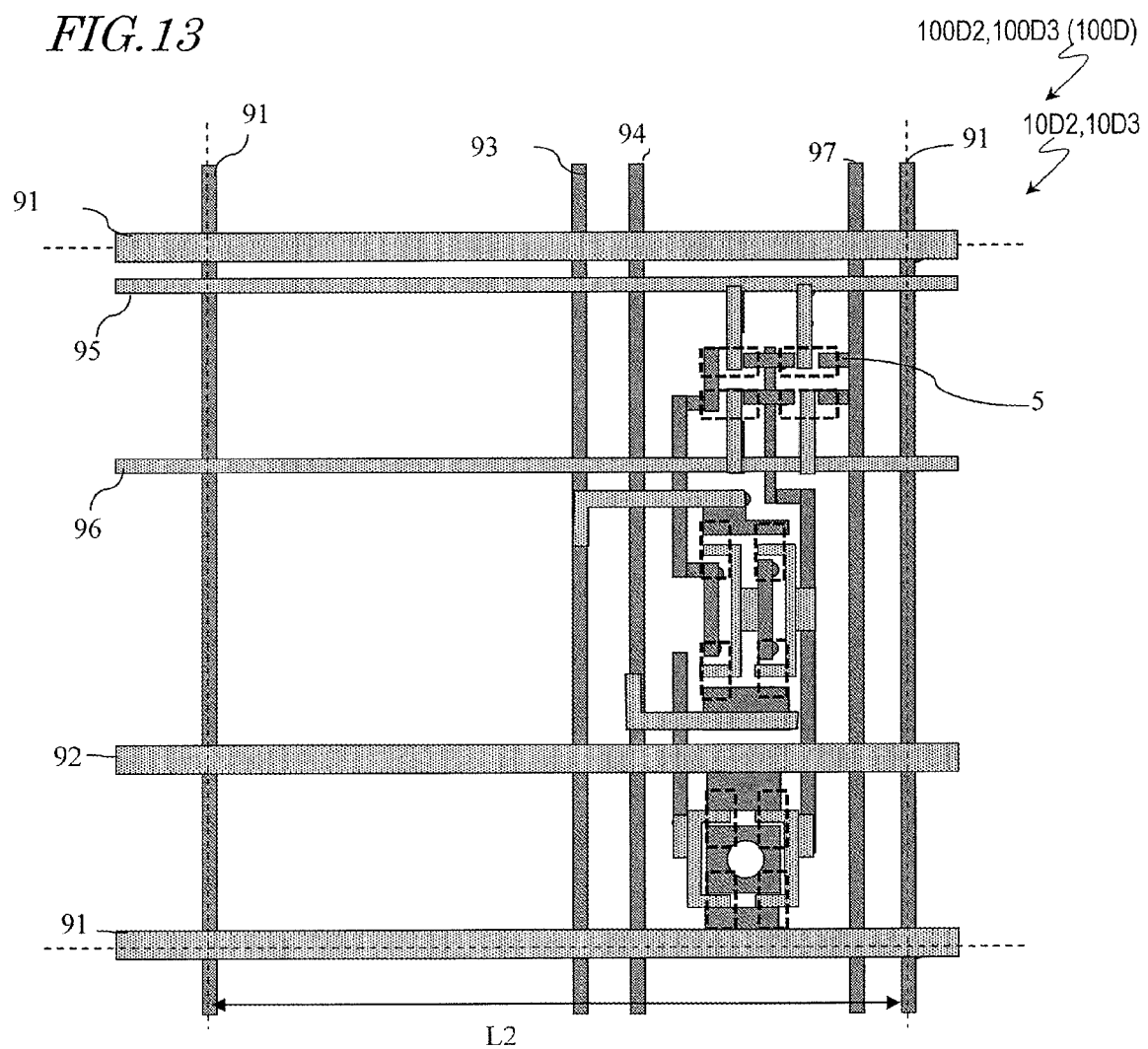
FIG. 13 A schematic plan view of a semiconductor device 10D2, 10D3 of a liquid crystal display device 100D2, 100D3.

Next, a liquid crystal display device 100D2 of still another embodiment of the present invention is described with reference to FIG. 13. FIG. 13 is a schematic plan view of a semiconductor device 10D2 of the liquid crystal display device 100D2. The liquid crystal display device 100D2 is a reflective liquid crystal display device.

The liquid crystal display device 100D2 is a liquid crystal display device which includes a semiconductor device 10D2 in place of the semiconductor device 10D1 of the liquid crystal display device 100D1. The difference between the semiconductor device 10D2 and the semiconductor device 10D1 resides in that the TFTs 5 and the wires 15 occupy about ⅓ of the area of the pixel. Therefore, about ⅔ of the area of the scatter reflection electrodes 4d is flat and does not have the above-described unevenness. The manufacturing methods of the semiconductor device 10D2 and the liquid crystal display device 100D2 and the evaluation of the reflection characteristics of the scatter reflection electrodes 4d are the same as those of the semiconductor device 10D1 and the liquid crystal display device 100D1, respectively.

Next, a liquid crystal display device 100D3 of still another embodiment of the present invention is described.

The liquid crystal display device 100D3 is a liquid crystal display device which has the same constituents as those of the liquid crystal display device 100D2 except that the thickness of the interlayer insulating film 19 is 3.5 μm. That is, a semiconductor device 10D3 of the liquid crystal display device 100D3 and the semiconductor device 10D2 are different only in the thickness of the interlayer insulating film 19. The manufacturing methods of the semiconductor device 10D3 and the liquid crystal display device 100D3 and the evaluation of the reflection characteristics of the scatter reflection electrodes 4d are the same as those of the semiconductor device 10D1 and the liquid crystal display device 100D1.

COMPARATIVE EXAMPLE 1

As Comparative Example 1, a liquid crystal display device 300 was manufactured in which only the thickness of the interlayer insulating film 19 of the liquid crystal display device 100D2 was 4.5 μm. That is, a semiconductor device 30 of the liquid crystal display device 300 and the semiconductor device 10D2 are different only in the thickness of the interlayer insulating film 19. The manufacturing methods of the semiconductor device 30 and the liquid crystal display device 300 and the evaluation of the reflection characteristics of the scatter reflection electrodes 4d are the same as those of the semiconductor device 10D1 and the liquid crystal display device 100D1.

REFERENCE EXAMPLE 1

Measurement of the reflection characteristics was carried out using a sample that was prepared as Reference Example 1 by depositing Al to 200 nm thick on an optical film which was provided with an antiglare treatment for use in liquid crystal television displays (AG750 manufactured by Nitto Denko Corporation).

(Evaluation Results)

The evaluation results of the liquid crystal display devices 100D1 to 100D3 and the liquid crystal display device 300 are shown in Table 1.

TABLE 1

| Liquid crystal display device | Interlayer insulating film thickness | Occupation rate of TFTs and wires | Unevenness of reflective electrode | Display quality | Integrating sphere reflectance |
|---|---|---|---|---|---|
| 100D1 | 2.5 μm | Substantially entire pixel | 500 nm | ◯ | 5.7% |
| 100D2 | 2.5 μm | about ⅓ | 500 nm | ◯ | 4.8% |
| 100D3 | 3.5 μm | about ⅓ | 100 nm | Δ | 2.1% |
| 300 | 4.5 μm | about ⅓ | 50 nm | X | 1.5% |

Here, the display quality was evaluated by an observer's eye in a room illuminated with a fluorescent lamp under the conditions that the illuminance at the panel surface was 500 Lux and the observer's face was reflected in the panel. ◯ means that the reflection was substantially unnoticeable. Δ means that the reflection was slightly noticeable. X means that the reflection was excessive so that the display was not readily observed. The difference between the highest portion and the lowest portion of the unevenness of the scatter reflection electrodes 4d was also measured using a stylus profilometer.

As clearly seen from Table 1, excellent display quality was achieved when the interlayer insulating film 19 was not less than 2.5 μm and not more than 3.5 μm and the difference between the highest portion and the lowest portion of the unevenness of the scatter reflection electrodes 4d was not less than 100 nm and not more than 500 nm.

Figure 14:
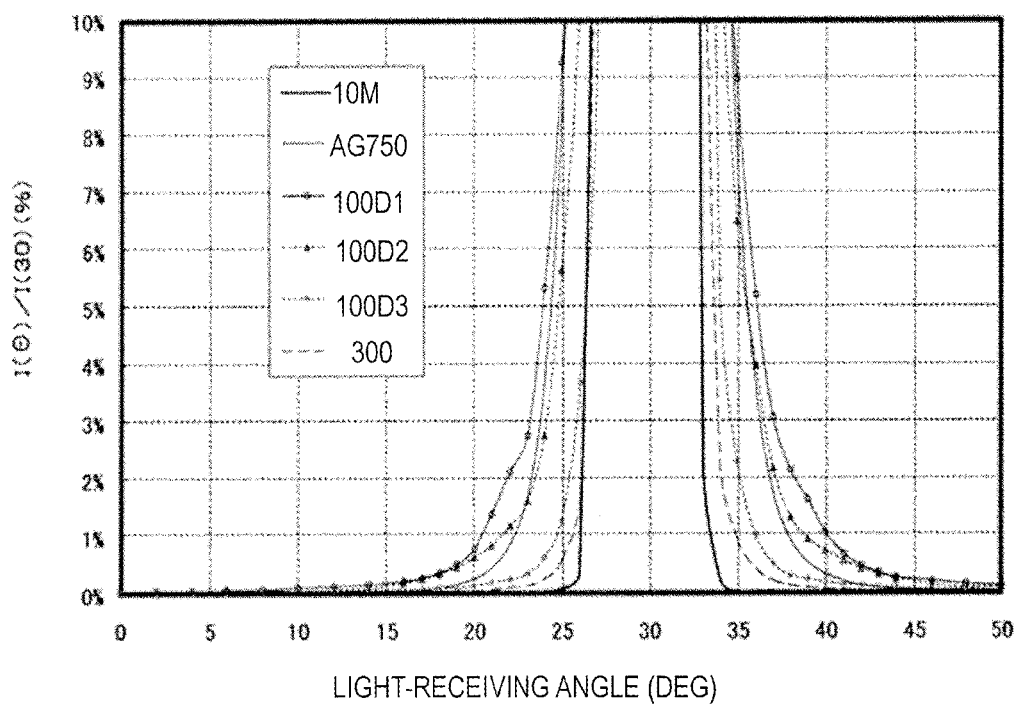
FIG. 14 A graph showing the measurement results of the reflection characteristics.

FIG. 14 shows the measurement results of the reflection characteristics. The reflection characteristic of a mirror surface 10M was also measured for comparison purposes. It can be seen that the scatter reflection electrodes 4d of the semiconductor device 10D1 to 10D3 of the liquid crystal display devices 100D1 to 100D3 that exhibited excellent display quality had I(35°)/I(30°) values in the range of 2% to 10%. The I(35°)/I(30°) value of the scatter reflection electrodes 4d of the semiconductor device 10D1 was generally equal to the I(35°)/I(30°) value of the sample of Reference Example 1 (AG750). The I(40°)/I(30°) values of the scatter reflection electrodes 4d of the semiconductor devices 10D1 to 10D3 were not more than 2%. Note that I(θ°) refers to the intensity of reflected light which was measured in a direction of θ° with respect to the normal direction of the scatter reflection electrodes 4d (where the clockwise direction is the positive direction, and the counterclockwise direction is the negative direction).

The liquid crystal display devices 100D1 to 100D3 that include the semiconductor devices 10D1 to 10D3 exhibit excellent display quality such that reflection of external images which is equivalent to that detected in liquid crystal television displays widely sold at present on the market is unnoticeable.

Thus, the liquid crystal display devices 100A to 100D enable provision of a liquid crystal display device which is capable of achieving a high contrast ratio and which can be manufactured by a simple and convenient method.

INDUSTRIAL APPLICABILITY

The present invention is applicable to liquid crystal display devices and a variety of electrical devices in which a liquid crystal display device is used.

REFERENCE SIGNS LIST 1 liquid crystal layer
2, 3 insulating substrate
10 wall
12, 13 alignment film
14, 14a, 14b, 14a', 14b' small section
21, 21a, 21b dichromatic dye

The invention claimed is:

1. A liquid crystal display device having pixels, comprising:
a liquid crystal layer whose state is switchable between a light-transmitting state in which light is transmitted through the liquid crystal layer and a light-scattering state in which light is scattered by the liquid crystal layer;
a first substrate and a second substrate between which the liquid crystal layer is held;
a pair of electrodes between which the liquid crystal layer is interposed and which are configured to apply a voltage across the liquid crystal layer; and
first and second alignment films respectively provided between the liquid crystal layer and the first substrate and between the liquid crystal layer and the second substrate, the first and second alignment films being provided with an alignment treatment,
wherein the liquid crystal layer includes, in the pixels,
a continuous wall,
a plurality of first small sections separated by the wall and the first alignment film, and
a plurality of second small sections separated by the wall and the second alignment film,
each of the plurality of first small sections has a first liquid crystal region,
each of the plurality of second small sections has a second liquid crystal region,
each of the first and second liquid crystal regions includes a nematic liquid crystal material and a dichromatic dye,
the nematic liquid crystal material and the dichromatic dye in the first liquid crystal region are in contact with the first alignment film, and the nematic liquid crystal material and the dichromatic dye in the second liquid crystal region are in contact with the second alignment film,
the liquid crystal layer does not include a small section separated only by the wall,
the dichromatic dye of the first liquid crystal region is aligned along a first azimuth which is defined by the first alignment film, and
the dichromatic dye of the second liquid crystal region is aligned along a second azimuth which is defined by the second alignment film.

2. The liquid crystal display device of claim 1, wherein the first azimuth and the second azimuth are perpendicular to each other.

3. The liquid crystal display device of claim 1, wherein the first and second liquid crystal regions do not contain a chiral agent.

4. The liquid crystal display device of claim 1, wherein the liquid crystal layer includes the plurality of first and second small sections at a density of 0.064 sections/$\mu m^2$ or higher.

5. The liquid crystal display device of claim 4, wherein the liquid crystal layer includes the plurality of first and second small sections at a density of 1 section/$\mu m^2$ or higher.

6. The liquid crystal display device of claim 1, wherein a maximum width of each of the plurality of first and second small sections is not less than 0.6 μm and not more than 6 μm.

7. The liquid crystal display device of claim 1, wherein a difference between an extraordinary refractive index ne and an ordinary refractive index no of the nematic liquid crystal material included in the first and second liquid crystal regions is not less than 0.1 and not more than 0.3.

8. The liquid crystal display device of claim 1, further comprising a plurality of third and fourth small sections which are separated by the wall, wherein
the plurality of third small sections are present in the vicinity of the first alignment film and each have a third liquid crystal region,
the plurality of fourth small sections are present in the vicinity of the second alignment film and each have a fourth liquid crystal region,
each of the third and fourth liquid crystal regions includes the nematic liquid crystal material and the dichromatic dye,
the dichromatic dye of the third liquid crystal region is aligned along the first azimuth, and
the dichromatic dye of the fourth liquid crystal region is aligned along the second azimuth.

9. The liquid crystal display device of claim 1, wherein a surface free energy of the first and second alignment films is not less than 44 mJ/$m^2$ and not more than 50 mJ/$m^2$.

10. The liquid crystal display device of claim 1, wherein a dielectric anisotropy of the nematic liquid crystal material is positive.

11. The liquid crystal display device of claim 1, wherein each of the pair of electrodes which are configured to apply a voltage across the liquid crystal layer is a transparent electrode.

12. The liquid crystal display device of claim 1, wherein any one of the pair of electrodes which are configured to apply a voltage across the liquid crystal layer is a reflective electrode.

13. The liquid crystal display device of claim 1, wherein any one of the pair of electrodes which are configured to apply a voltage across the liquid crystal layer is a scatter reflection electrode.

14. The liquid crystal display device of claim 13, wherein
a surface of the scatter reflection electrode has unevenness, and
a difference between a highest portion and a lowest portion of the surface of the scatter reflection electrode which is attributed to the unevenness is not less than 100 nm and not more than 500 nm.

15. The liquid crystal display device of claim 14, further comprising
- an active element which is provided on the first substrate and which is provided in each of the pixels, the active element having a memory property,
- a wire which is provided on the first substrate, and
- an interlayer insulating film which is provided on the active element and the wire,
- wherein the scatter reflection electrode is provided on the interlayer insulating film, and
- when measuring an intensity of reflection by the scatter reflection electrode of light which is incident on the scatter reflection electrode from a direction of $-30°$ with respect to a normal direction of the scatter reflection electrode where a clockwise direction is a positive direction and a counterclockwise direction is a negative direction, $0.02<I(35°)/I(30°)<0.1$ holds true (where)$I(\theta°)$ is an intensity of reflection which is measured in a direction of $\theta°$ with respect to the normal direction of the scatter reflection electrode).

16. The liquid crystal display device of claim 15, wherein $I(40°)/I(30°)<0.02$ also holds true.

17. The liquid crystal display device of claim 15, wherein a region in which the active element and the wire are provided occupies ⅓ or more of an area of the pixel.

18. The liquid crystal display device of claim 15, wherein a portion of the interlayer insulating film extending over a region in which none of the active element and the wire is provided has unevenness which is formed by patterning the portion.

19. The liquid crystal display device of claim 15, wherein a thickness of the interlayer insulating film is not less than 1.5 µm and not more than 3.5 µm.

20. The liquid crystal display device of claim 1, wherein the dichromatic dye is a dichromatic fluorescent dye.

* * * * *